US009821768B2

(12) United States Patent
Oz et al.

(10) Patent No.: US 9,821,768 B2
(45) Date of Patent: Nov. 21, 2017

(54) GEO-PROXIMITY VEHICLE ALERT AND ACCESS SYSTEM FOR SECURITY AND PACKAGE EXCHANGE EFFICIENCY

(71) Applicant: Continental Intelligent Transportation Systems, LLC, Santa Clara, CA (US)

(72) Inventors: Seval Oz, San Jose, CA (US); Alexander Marc Klotz, Mountain View, CA (US); Sudeep Kaushik, Fremont, CA (US); Yao Zhai, Fremont, CA (US); Francisco Fernandez Nares, Morgan Hill, CA (US); Adrian Ramos Aguayo, San Jose, CA (US); Tammer Zein El-Abedein, Campbell, CA (US)

(73) Assignee: Continental Intelligent Transportation Systems LLC, San Jose, CA (US)

( * ) Notice: Subject to any disclaimer, the term of this patent is extended or adjusted under 35 U.S.C. 154(b) by 32 days.

(21) Appl. No.: 14/792,453

(22) Filed: Jul. 6, 2015

(65) Prior Publication Data
US 2016/0096508 A1 Apr. 7, 2016

Related U.S. Application Data

(60) Provisional application No. 62/058,410, filed on Oct. 1, 2014.

(51) Int. Cl.
*B60R 25/20* (2013.01)
*H04W 12/06* (2009.01)
(Continued)

(52) U.S. Cl.
CPC ............. *B60R 25/20* (2013.01); *B60R 25/10* (2013.01); *G01S 19/01* (2013.01); *G06F 21/60* (2013.01);
(Continued)

(58) Field of Classification Search
CPC ............... G06Q 10/0833; G06Q 10/08; G06Q 10/08355; G06Q 10/0832; G06Q 10/0838;
(Continued)

(56) References Cited

U.S. PATENT DOCUMENTS 4,794,368 A * 12/1988 Grossheim .............. B60R 25/04
340/426.25
5,864,297 A 1/1999 Sollestre et al.
(Continued)

FOREIGN PATENT DOCUMENTS

EP       1 564 690       8/2005
WO    WO 2013/092306 A2    6/2013

OTHER PUBLICATIONS

International Search Report and Written Opinion for International Patent Application No. PCT/US2015/053210 dated Dec. 28, 2015, 11 pages, International Searching Authority, Alexandria VA.

(Continued)

*Primary Examiner* — Abby Lin

(57) ABSTRACT

A geo-proximity Vehicle Alert and Access System (VAAS) is discussed that has a cloud based server having a GPS-based proximity system to control and track a package exchange process, to speed up a package delivery and pick-up process, and to ensure security for the package exchange process. The cloud based server is configured to receive both current GPS coordinates of a package carrier's vehicle and current GPS coordinates of a target vehicle for at least one of package delivery to the target vehicle and package pick up from the target vehicle. The cloud based server is configured to send to the target vehicle the commands to wake-up an on-board telematics module, to give an
(Continued)

alert, to unlock the target vehicle, and to lock the target vehicle after receiving a confirmation of the package exchange process.

17 Claims, 24 Drawing Sheets

(51) Int. Cl.

| | | |
|---|---|---|
| G06F 21/60 | (2013.01) | |
| H04L 29/06 | (2006.01) | |
| G06Q 10/08 | (2012.01) | |
| H04L 29/08 | (2006.01) | |
| G01S 19/01 | (2010.01) | |
| B60R 25/10 | (2013.01) | |
| G01S 19/14 | (2010.01) | |

(52) U.S. Cl.
CPC ......... *G06Q 10/0833* (2013.01); *H04L 63/08* (2013.01); *H04L 67/10* (2013.01); *H04L 67/125* (2013.01); *H04L 67/18* (2013.01); *H04W 12/06* (2013.01); *B60R 25/2036* (2013.01); *B60R 2325/108* (2013.01); *G01S 19/14* (2013.01)

(58) Field of Classification Search
CPC ..... G06Q 10/025; G06Q 50/30; H04W 12/06; H04W 12/08; H04W 12/04; H04W 4/046; H04W 60/04; G06F 21/60; B60R 25/20; B60R 25/10; B60R 25/24; B60R 25/04; B60R 25/209; B60R 25/1001; B60R 25/33; B60R 25/2036; B60R 2325/101; B60R 2325/103; B60R 2325/105; B60R 2325/106; B60R 2325/108; B60R 2325/202; B60R 2325/205; B60R 2325/10; B60R 2325/20; G01S 19/01; G01S 19/14; H04L 67/18; H04L 67/125; H04L 67/10; H04L 67/12; H04L 63/0471; H04L 63/08; H04L 63/0823; H04L 63/0853; H04L 63/10; H04L 63/102; H04L 9/3226; G07C 2009/00769; G07C 2009/00261; G07C 2009/00388; G07C 2009/00825; G07C 2009/00823; G07C 2209/63; G07C 9/00309; G07C 9/00182; G07C 9/00571; G07C 9/00103; G07C 9/00817; G07C 9/00896; G07C 5/008; G07C 5/085
See application file for complete search history.

(56) References Cited

U.S. PATENT DOCUMENTS

| | | | |
|---|---|---|---|
| 6,073,064 | A | 6/2000 | Konrad et al. |
| 6,529,808 | B1 | 3/2003 | Diem |
| 7,432,796 | B2 | 10/2008 | Kawamura et al. |
| 8,232,897 | B2 | 7/2012 | Tieman et al. |
| 8,571,551 | B1 | 10/2013 | Bertz et al. |
| 2003/0080875 | A1 | 5/2003 | Wathen |
| 2008/0021747 | A1 | 1/2008 | Moeller et al. |
| 2008/0148374 | A1 | 6/2008 | Spaur |
| 2009/0096575 | A1* | 4/2009 | Tieman ............... G07C 9/00309 340/5.62 |
| 2009/0160607 | A1 | 6/2009 | Edwards et al. |
| 2009/0248222 | A1 | 10/2009 | McGarry et al. |
| 2010/0075655 | A1 | 3/2010 | Howarter et al. |
| 2011/0032075 | A1 | 2/2011 | Alrabady et al. |
| 2011/0112969 | A1 | 5/2011 | Zaid et al. |
| 2011/0257817 | A1 | 10/2011 | Tieman |
| 2012/0268242 | A1 | 10/2012 | Tieman et al. |
| 2014/0095214 | A1 | 4/2014 | Mathe et al. |
| 2014/0180959 | A1 | 6/2014 | Gillen et al. |
| 2014/0229501 | A1 | 8/2014 | Josefiak |
| 2015/0215779 | A1 | 7/2015 | Fokkelman et al. |

OTHER PUBLICATIONS

Continental: Open Sesame: Continental With mobile phones are at a great car keys Nov. 13, 2011, (6 pages).

"Cardrops, your car becomes an e-commerce delivery point"; downloaded from Internet Sep. 27, 2015, 5 pages, http://www.cardrops.com.

Behrmann, Elisabeth; Weiss, Richard, "Volvo Said to Near Deal to Deliver Parcels to Parked Cars" 6 pages. Nov. 17, 2014. Downloaded Dec. 10, 2014 from www.bloomberg.com/news/2014-11-17/volvo-said-to-near-deal . . . .

* cited by examiner

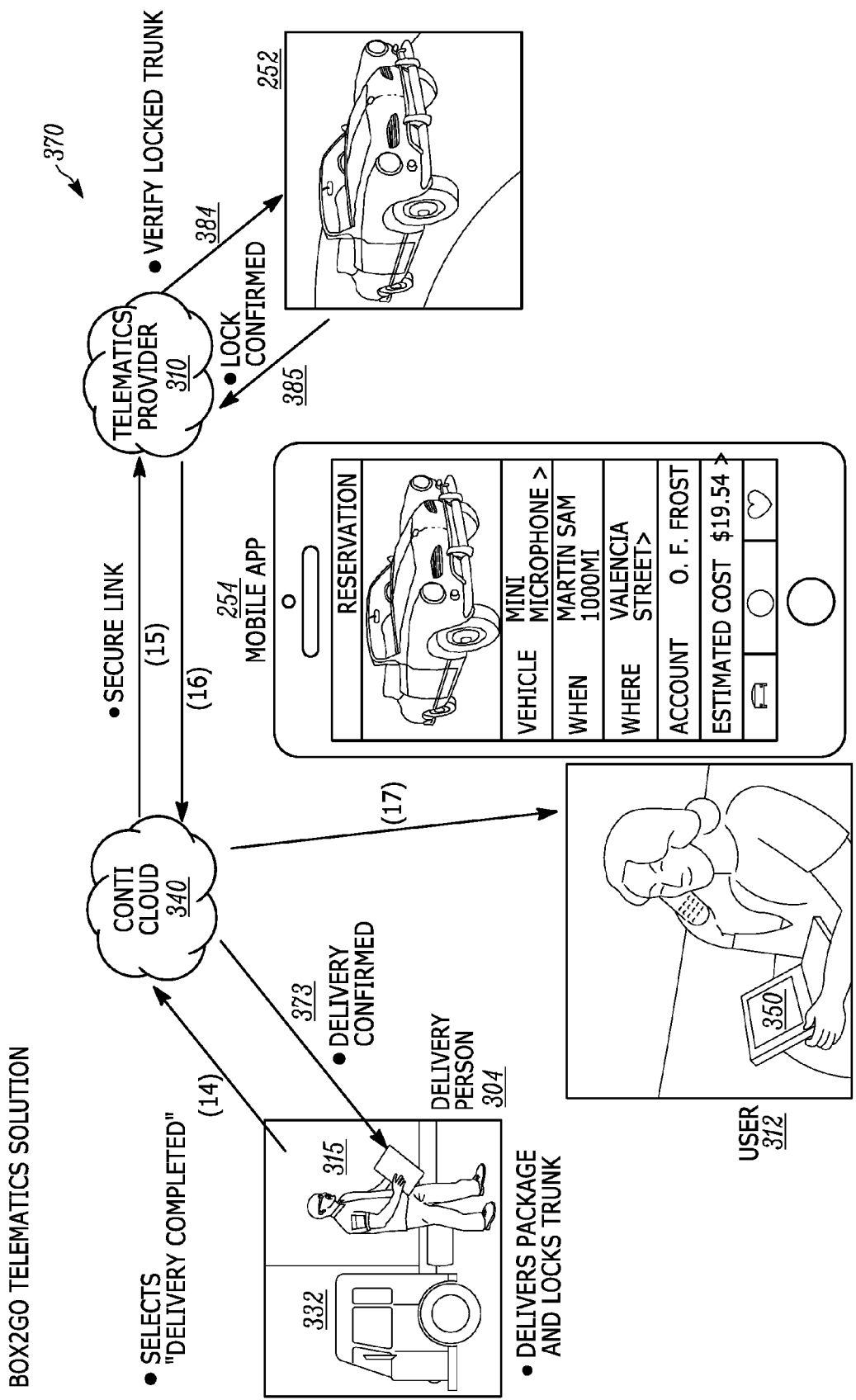

BOX2GO TELEMATICS VALUE PROPOSITION
> THE PRIORITY PACKAGE PROBLEM
• WHAT HAPPENS WHEN YOU ARE NOT AT HOME?

• PRIORITY PACKAGE

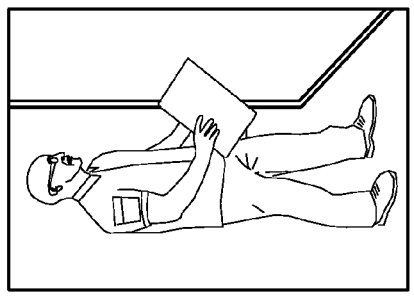

DELIVERY PERSON 304

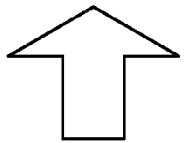

• MISSED DELIVERY

TO PICK UP YOUR PACKAGE(S) TODAY:

3700 SOUTH ROBERTSON BOULEVARD
LOS ANGELES, CA 90034

• BUSY AT WORK

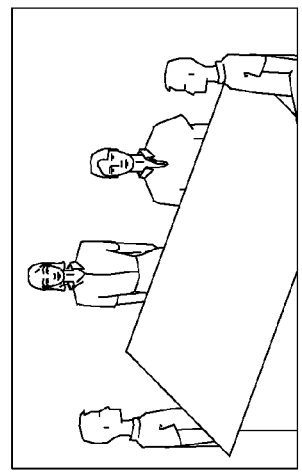

• WHAT ARE THE OPTIONS?

○ CARRIER
  -ATTEMPT RE-DELIVERY

○ YOU
  - RELEASE LIABILITY
  -WAIT FOR IT AT HOME, OR
  -PICK IT UP AT NIGHT

Figure 8A

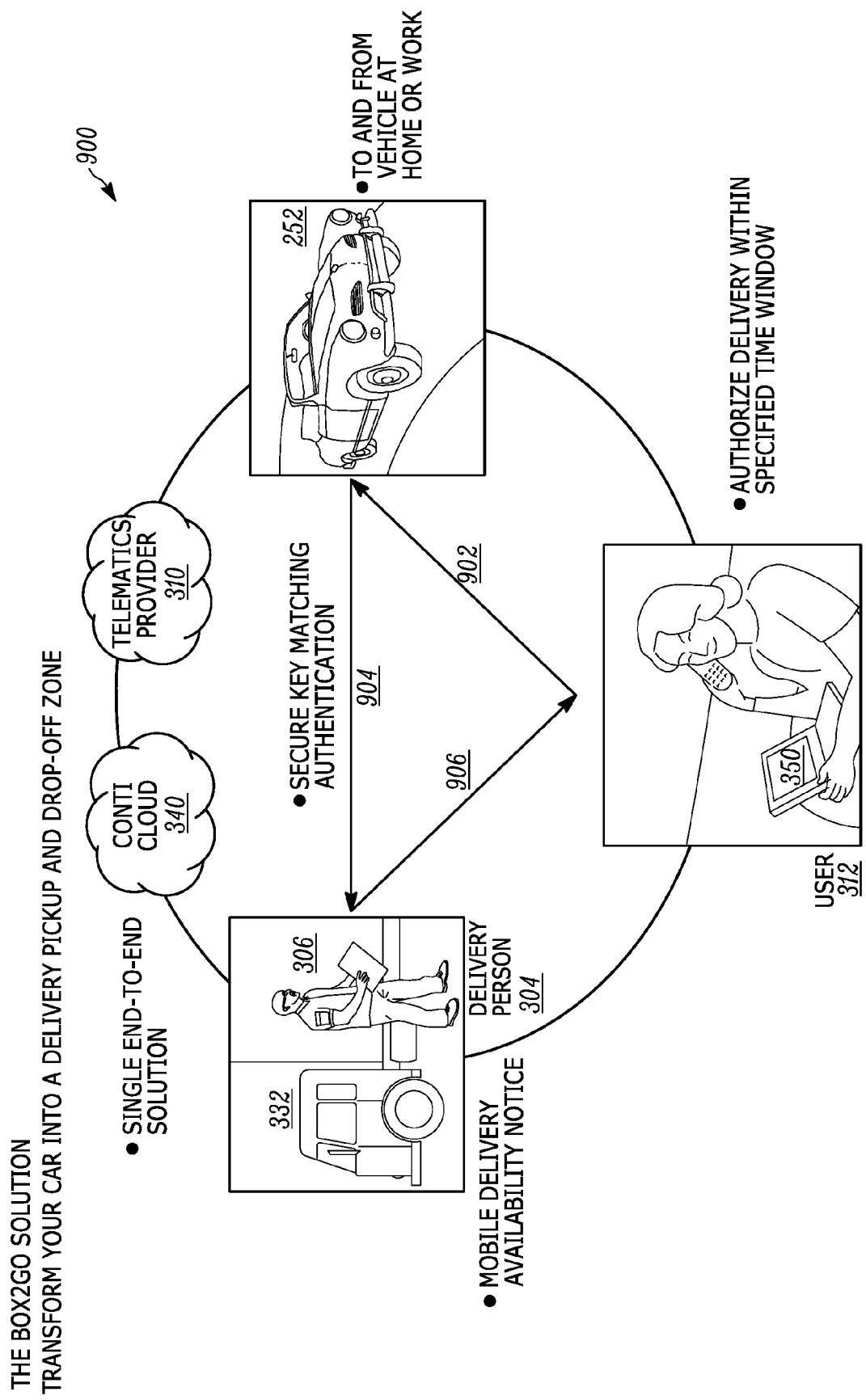

GEO-PROXIMITY VEHICLE ALERT AND ACCESS SYSTEM FOR SECURITY AND PACKAGE EXCHANGE EFFICIENCY

RELATED APPLICATIONS

This application claims the benefit of U.S. Provisional Patent Application No. 62/058,410, filed Oct. 1, 2014, and entitled "PACKAGE DELIVERY TO AND PICK-UP FROM A VEHICLE", which is incorporated herein by reference in its entirety.

FIELD

The design generally relates to a package delivery to and pick-up from a vehicle system.

BACKGROUND

Typically, shipments are usually sent to the home address of the person concerned. This technology instead delivers packages to or picks-up a package inside a customer's vehicle while ensuring safe delivery at the exchange location.

SUMMARY

In general, a geo-proximity Vehicle Alert and Access System (VAAS) is described. The geo-proximity VAAS has a cloud based server having a Global Positioning System (GPS) based proximity system having one or more processors configured to execute instructions to control and track a package exchange process, to speed up a package delivery and pick-up process, and to ensure security for the package exchange process. The GPS-based proximity system is configured to receive both current GPS coordinates of a package carrier's vehicle and current GPS coordinates of a target vehicle for at least one of i) package delivery to the target vehicle and ii) package pick up from the target vehicle. The GPS-based proximity system is further configured to send to the target vehicle one or more commands. The GPS-based proximity system is configured to send to the target vehicle one or more commands 1) to wake-up an on-board actuation module in the target vehicle while in a close proximity established by a first threshold distance between the package carrier's vehicle and the target vehicle, 2) to give an alert from the target vehicle while in a close proximity established by a second threshold distance between the package carrier's vehicle and the target vehicle, 3) to unlock a door including a trunk of the target vehicle, and 4) established by a third threshold distance to lock the doors of the target vehicle after receiving a confirmation of the package exchange process from the client device associated with the package carrier's vehicle.

In an embodiment, a method of speedy delivery and pick-up and secure package exchange between a package carrier's vehicle and a target vehicle is described. The method includes controlling and tracking a package transfer by a cloud based system, and monitoring a distance between the package carrier's vehicle and the target vehicle by receiving current GPS coordinates of the package carrier's vehicle and GPS coordinates of the target vehicle. The method also includes waking-up an on-board telematics module of the target vehicle while establishing a close proximity by a first threshold distance between the package carrier's vehicle and the target vehicle, and giving an alert by the target vehicle while establishing a close proximity by a second threshold distance between the package delivery vehicle and the target vehicle. The method further includes unlocking the target vehicle and exchanging at least one package between the package carrier's vehicle and the target vehicle as well as receiving a confirmation of the package transfer and locking the target vehicle after receiving the confirmation.

In an embodiment, the cloud-based package-to-and-from-a-vehicle-service is based on a geo-proximity Vehicle Alert and Access System (VAAS) which is hosted on a cloud-based provider site that contains one or more servers and one or more databases. The package-to-and-from-a-vehicle-service provides a single common end-to-end solution between one or more delivery services and one or more Original equipment manufacturer (OEM) telematics systems without additional hardware needing to be installed in the vehicle by using one or more application programming interfaces and using downloadable applications resident in client devices.

In an embodiment, the cloud-based package-to-and-from-a-vehicle-service hosted on a cloud-based provider site contains two or more servers and two or more databases. The package-to-and-from-a-vehicle-service uses two or more paired-virtual keys, such as a dual-key protection mechanism, via secure key matching authentication in order to render hacking any single system's server useless. Additionally, the virtual keys are given a shelf life to limit authorized package delivery and subsequent activation of the vehicle's telematics system to within a specified time window (e.g., a predetermined time frame).

In an embodiment, the cloud-based package-to-and-from-a-vehicle-service hosted on a cloud-based provider site contains two or more servers and one or more databases. The package-to-and-from-a-vehicle-service uses a Global Positioning System (GPS)-based proximity system to control and track the package exchange process, to speed up the package delivery and pick-up process, and to ensure security for the package exchange. The package-to-and-from-a-vehicle-service also uses a mobile delivery notice to verify the origination of the package delivery order as well as to communicate a successful delivery or pick-up of a package.

In an embodiment, a method for an alternative package pickup and delivery system includes a number of example steps. The consumer while shopping at a retail store, at checkout, can purchase one or more selected products on a retail website. The consumer is offered on the user interface at checkout an alternative package delivery option to have the purchased products delivered to a vehicle using a cloud-based package-to-and-from-a-vehicle-service. The consumer selects the delivery method offered on the user interface labeled as "Box2Go Delivery," to have the package delivered to the consumer's vehicle. The package-to-and-from-a-vehicle-service processes the alternative package pickup and delivery option. The purchased products are delivered to the consumer's vehicle's location. The package-to-and-from-a-vehicle-service opens the consumer's vehicle and ensures the purchased products have been delivered. The package-to-and-from-a-vehicle-service ensures the consumer's vehicle is closed and locked when the purchased products have been delivered.

BRIEF DESCRIPTION OF THE DRAWINGS

The multiple drawings refer to the example embodiments of the design.

FIGS. 3A-3C illustrate block and flow diagrams of an embodiment of the alternative delivery system using a telematics solution.

FIGS. 8A-8D illustrate block and flow diagrams of embodiment of the value proposition of the alternative delivery system.

FIGS. 9A-9D illustrate block diagrams of embodiments of the multiple paired virtual keys and security authorization notices used by the package-to-and-from-a-vehicle-service.

Figure 1:
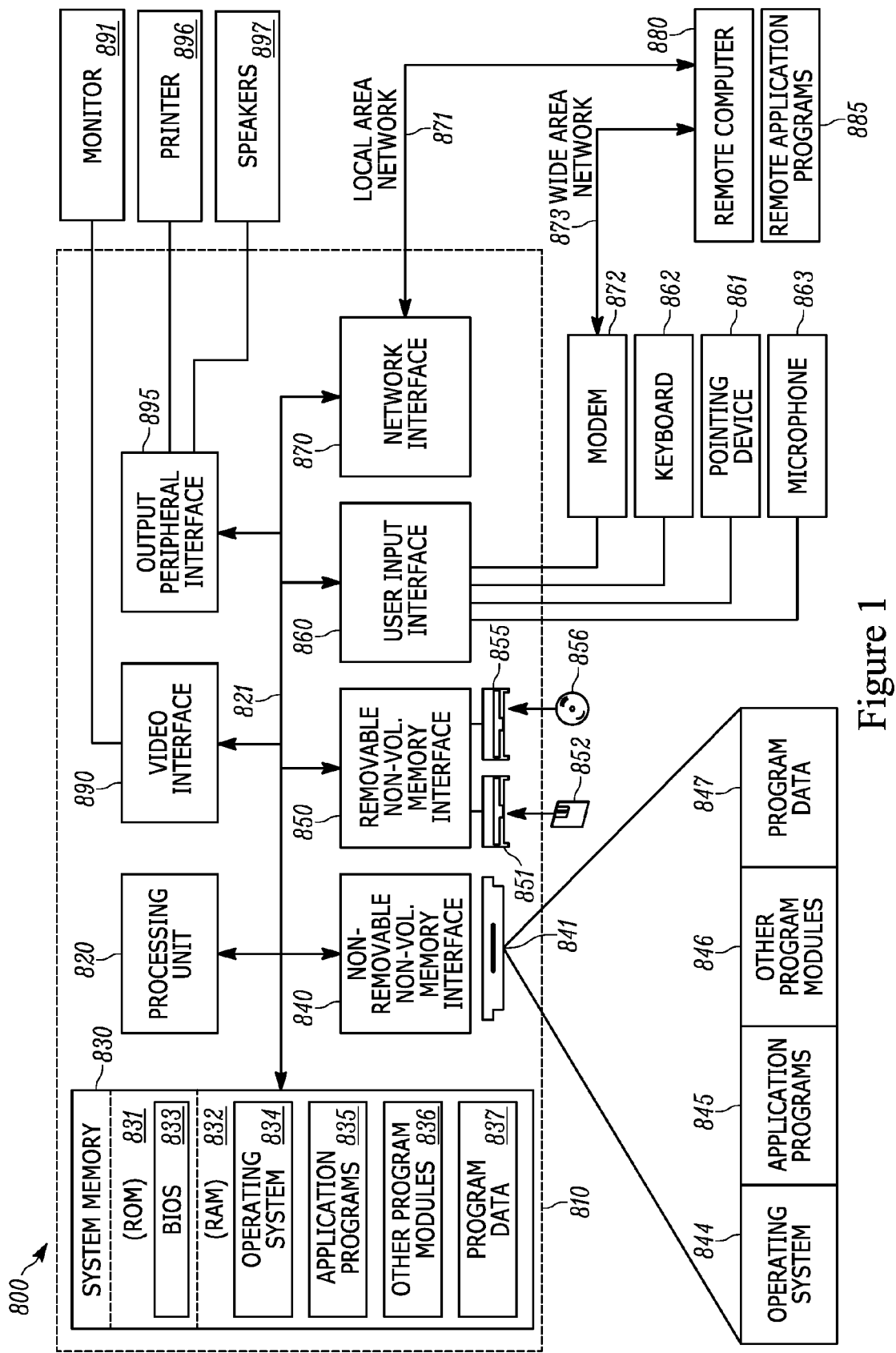
FIG. 1 illustrates a block diagram of an example computing system that may be used in an embodiment of one or more of the servers, in-vehicle electronic modules, and client devices discussed herein.

While the design is subject to various modifications and alternative forms, specific embodiments thereof have been shown by way of example in the drawings and will herein be described in detail. The design should be understood to not be limited to the particular forms disclosed, but on the contrary, the intention is to cover all modifications, equivalents, and alternatives falling within the spirit and scope of the design.

DETAILED DISCUSSION

In the following description, numerous specific details are set forth, such as examples of specific package delivery services, named components, connections, number of databases, etc., in order to provide a thorough understanding of the present design. It will be apparent; however, to one skilled in the art that the present design may be practiced without these specific details. In other instances, well known components or methods have not been described in detail but rather in a block diagram in order to avoid unnecessarily obscuring the present design. Thus, the specific details set forth are merely exemplary. The specific details discussed in one embodiment may be reasonably implemented in another embodiment. The specific details may be varied from and still be contemplated to be within the spirit and scope of the present design.

Figure 11:
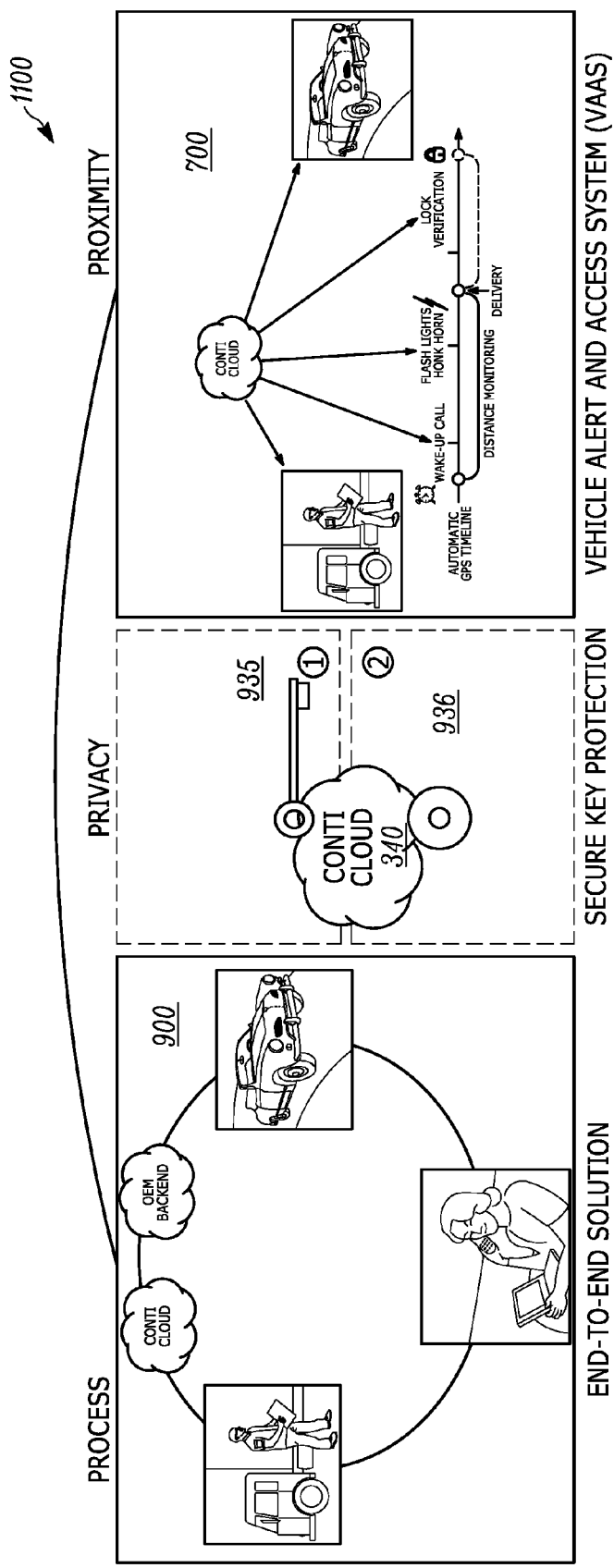
FIG. 11 illustrates a block diagram overview of an embodiment of the package-to-and-from-a-vehicle-service hosted on a cloud-based and some of its features including i) process connectivity to multiple platforms, ii) built in privacy and security, and iii) a vehicle awake and alert system via proximity.

In general, the package delivery to and pick-up from a vehicle service facilitates package delivery or pick up from a vehicle at home or work. The package-to-and-from-a-vehicle-service is implemented on a geo-proximity Vehicle Alert and Access System (VAAS) that may be hosted on a cloud-based provider site. The package-to-and-from-a-vehicle-service for speed delivery, pick-up, and secure package exchange between a package carrier's vehicle and a target vehicle which can be hosted on a cloud-based provider site may provide a single common end-to-end solution between two or more package delivery services and two or more Original equipment manufacturer (OEM) 'remote access/connectivity' systems, such as telematics systems, without additional hardware needing to be installed in the vehicle by using one or more application programming interfaces on the package-to-and-from-a-vehicle-service in the cloud and using downloadable applications resident in client devices. The package-to-and-from-a-vehicle-service may not store the user credentials for the OEM telematics systems in its databases and, in general, only encrypted data is transmitted from the cloud-based package-to-and-from-a-vehicle-service and i) the applications resident in client devices, ii) the package delivery systems, and iii) the OEM telematics systems. The package-to-and-from-a-vehicle-service uses a GPS-based proximity system to control and track the package exchange process, to speed up the package delivery and pick-up process, and to ensure security for the package exchange. The package-to-and-from-a-vehicle-service also uses a mobile delivery notice to verify the origination of the package delivery order as well as to communicate a successful delivery or pick up of a package. The package-to-and-from-a-vehicle-service picks up or delivers a package to wherever vehicle is parked, including the service can deliver package to or pick-up package from a rental car while on business trip. (See FIG. 11 for a block diagram overview of an embodiment 1100 of the package-to-and-from-a-vehicle-service hosted on a cloud-based and some of its features including i) process connectivity to multiple platforms, ii) built in privacy and security, and iii) a vehicle awake and alert system via proximity).

Figure 2A:
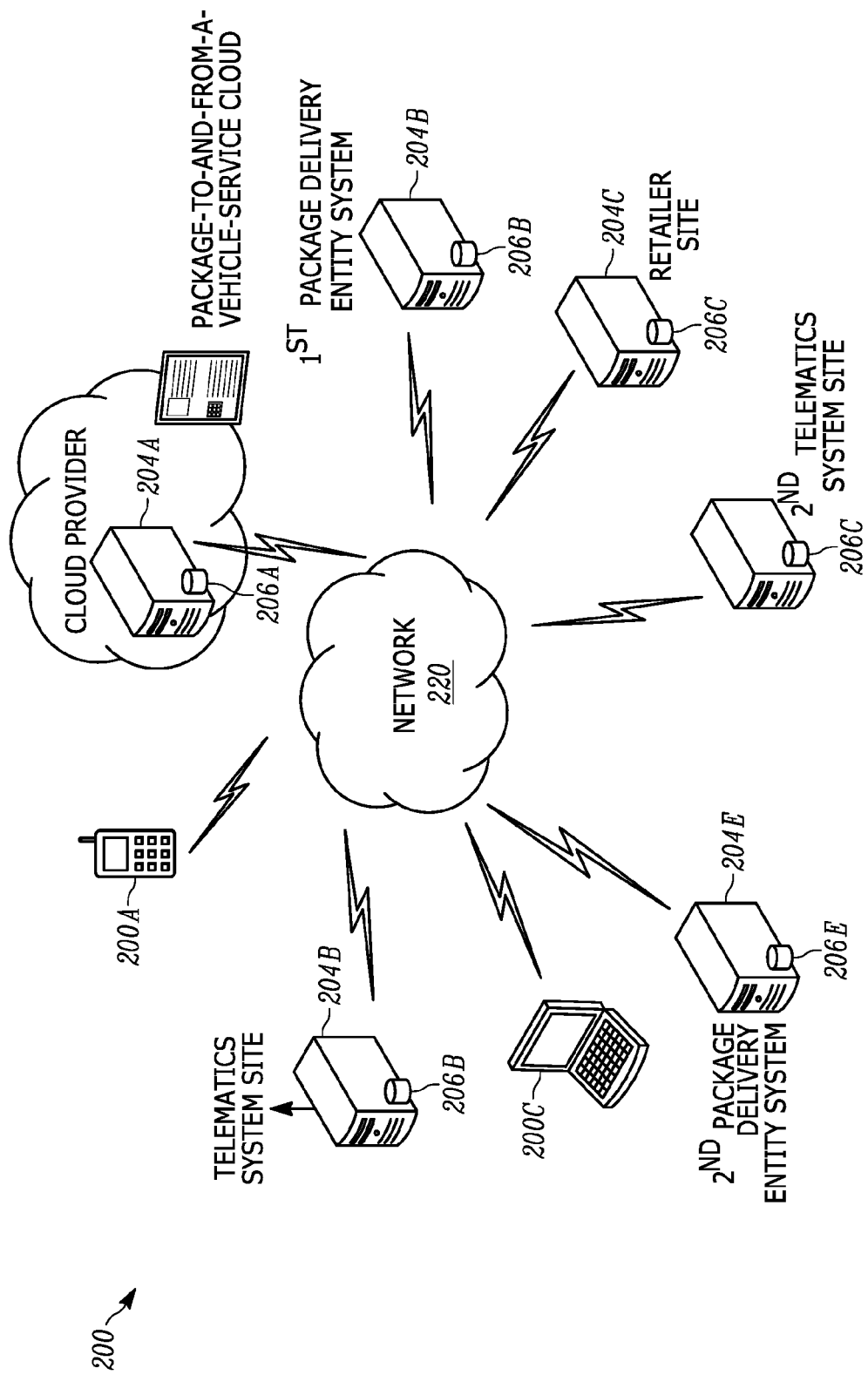
FIGS. 2A-2B illustrate block diagrams of embodiments of the package-to-and-from-a-vehicle-service hosted on a cloud-based provider site.
Figure 2B:
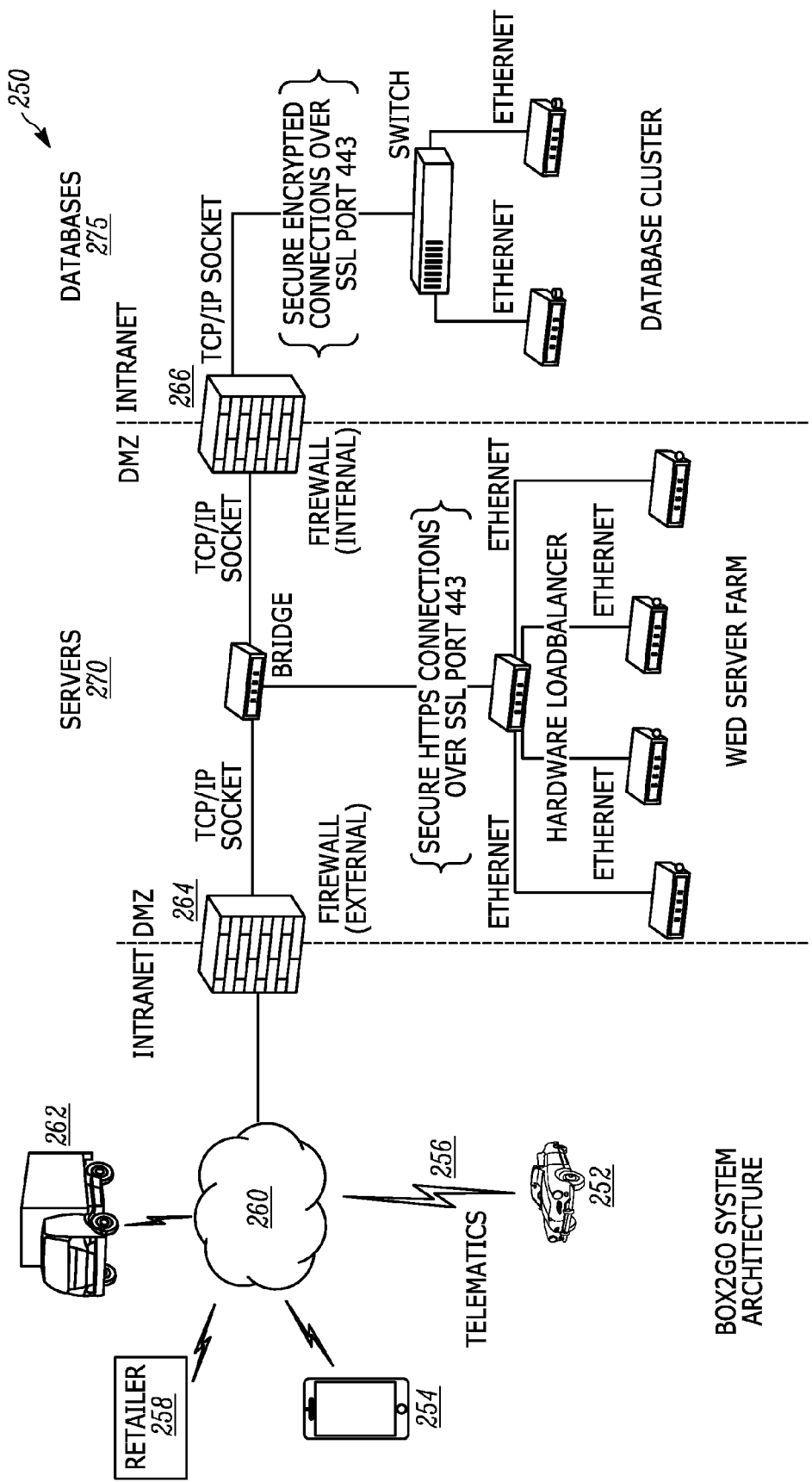

Example processes for and apparatuses to provide an automated process workflow for the entire cloud-based package-to-and-from-a-vehicle-service are described. The following drawings and text describe various example implementations of the design. FIG. 1 and FIGS. 2A-2B illustrate example environments to implement the concepts.

The cloud-based package-to-and-from-the-vehicle-service cloud system can be implemented in software, hardware electronics, and any combination of both and when one or more portions of the system are implemented in software, then that software is tangibly stored in an executable format on the one or more non-transitory storage mediums to be executed by a processing component.

Figure 3A:
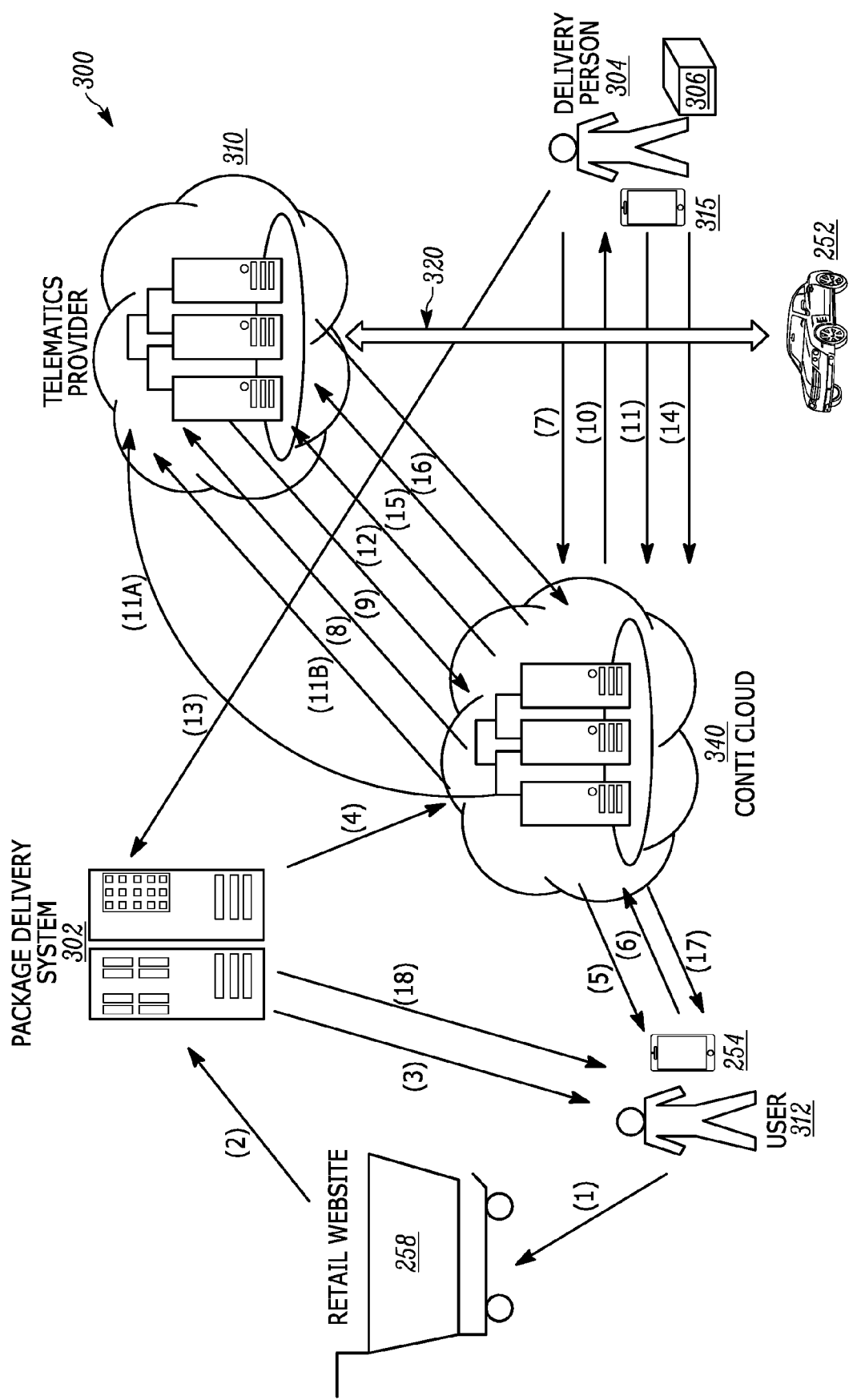
Figure 3B:
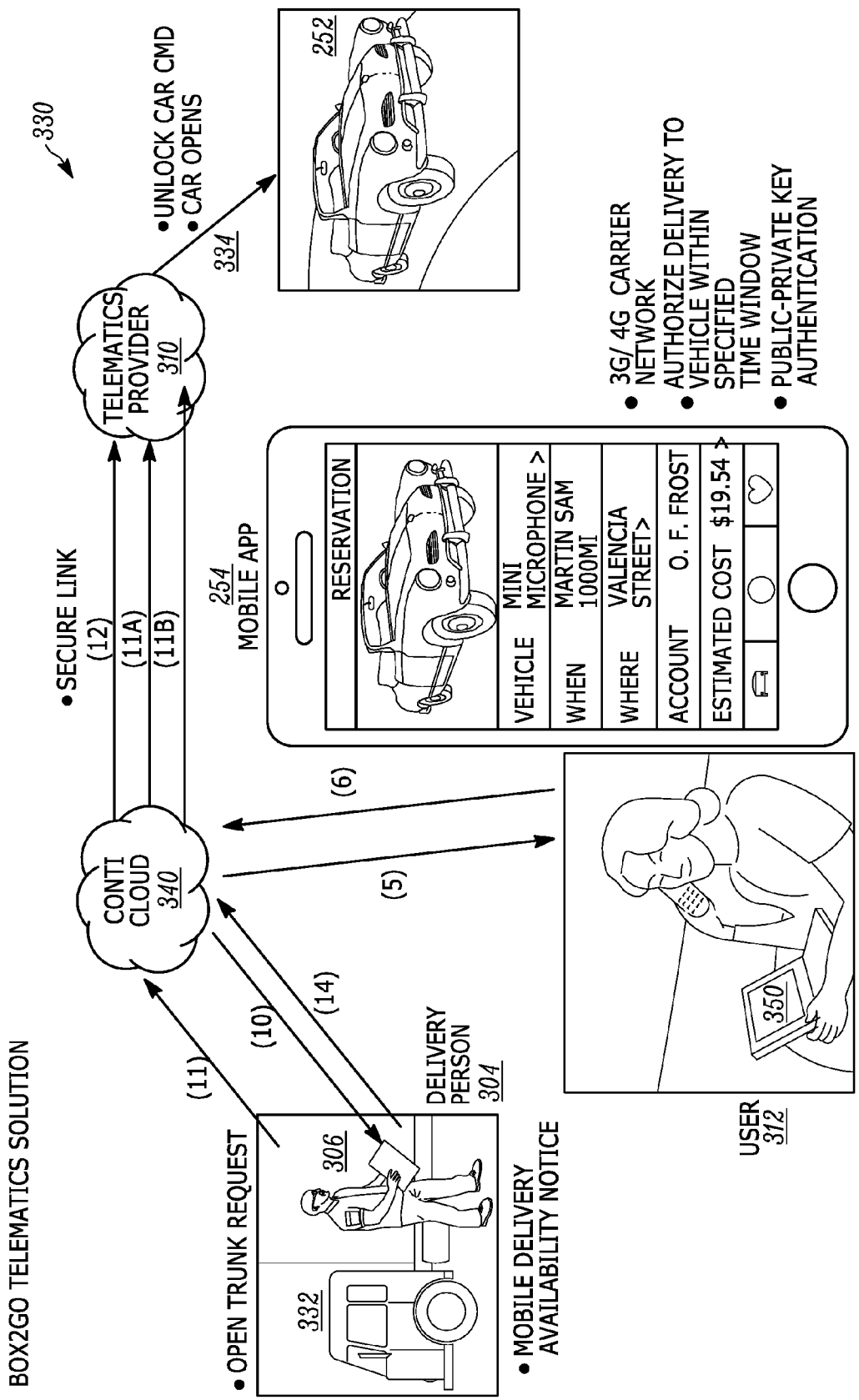

FIGS. 3A-3C illustrate block and flow diagrams of embodiments of the alternative delivery system using a telematics solution. FIGS. 3A-3C show a retail website 258, a package delivery system (e.g., Fedex) 302, a geo-proximity Vehicle Alert and Access System (package-to-and-from-the-vehicle-service cloud system) 340, and a Telematics provider 310.

Figure 5A:
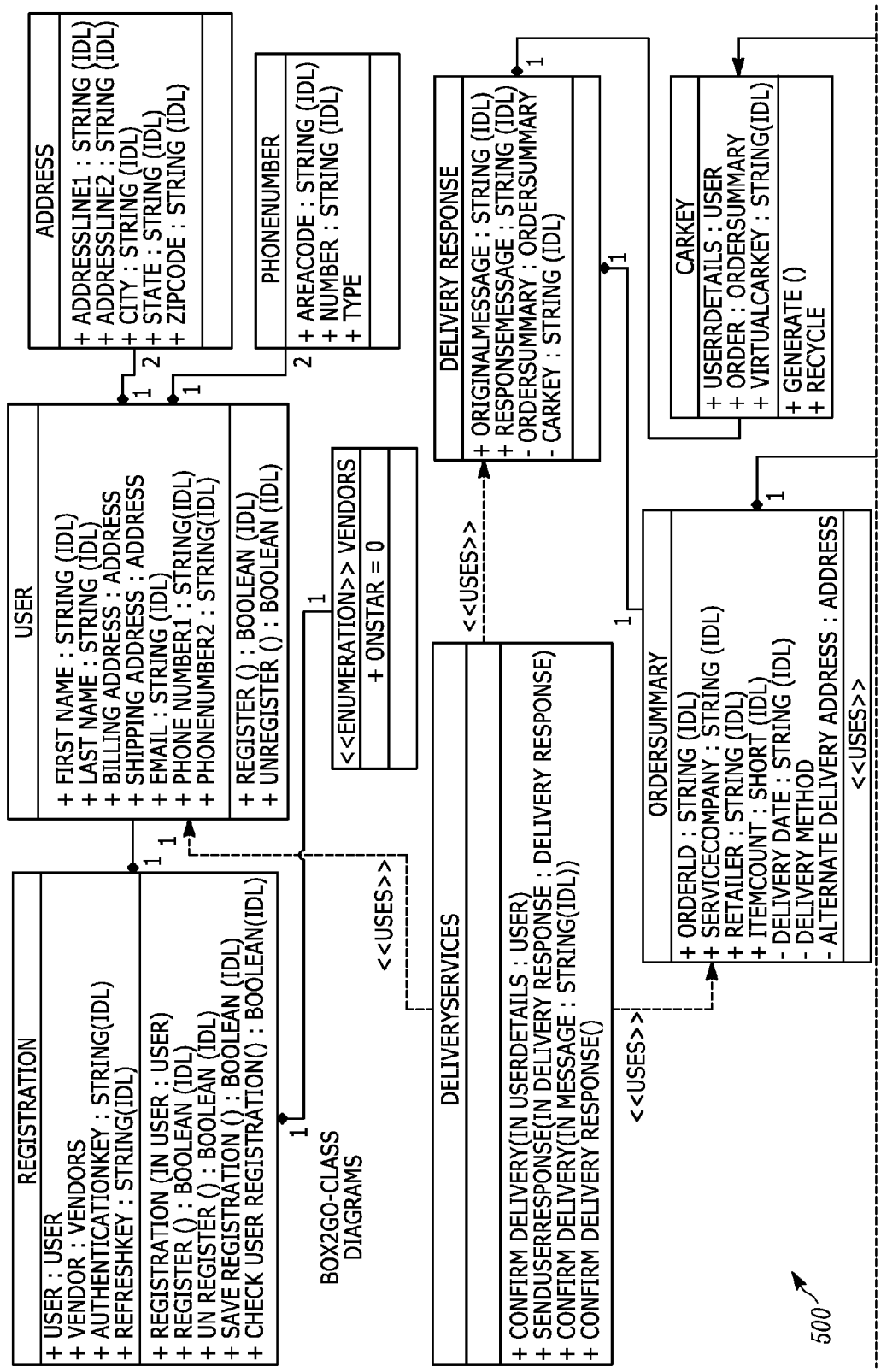
FIG. 5 illustrates an example class diagram of an embodiment of an application programming interface for the alternative package pickup and delivery system.
Figure 5B:
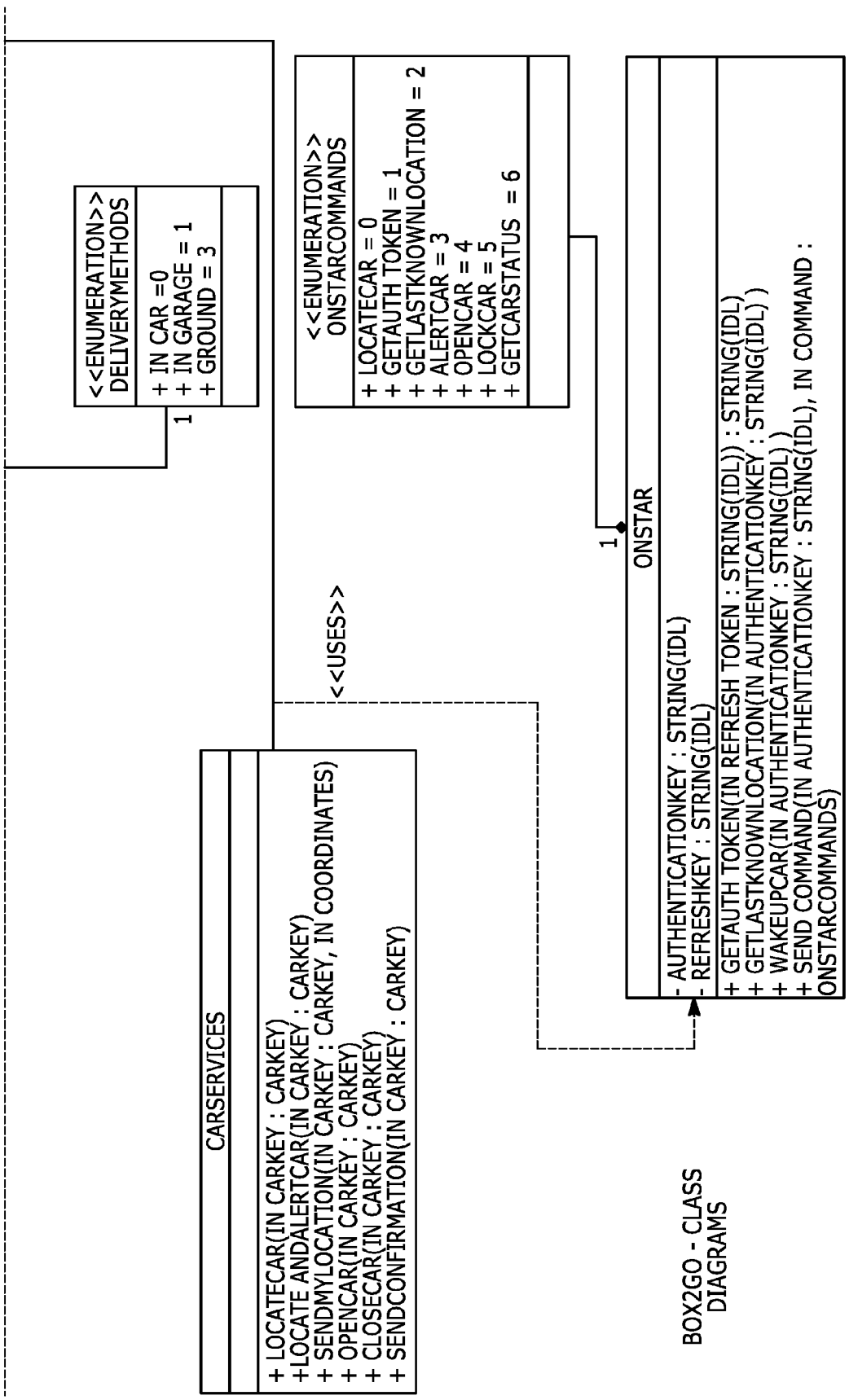

The package pickup and delivery system is discussed. The system includes a cloud-based package-to-and-from-a-vehicle-service that is hosted on a cloud-based provider site, one or more package delivery entity systems, such as FedEx™, having both a service website as well as one or more delivery vehicles with client devices having a first delivery application resident in each client device, and one or more OEM 'remote access/connectivity' systems 310, such as OnStar™, that are configured to have communications between the cloud and a vehicle in order to exchange information including GPS coordinates of the vehicle and interact with the vehicle's on-board intelligence system, such as an on-board telematics module, to cause electromechanical actions within that vehicle including: unlocking doors, opening windows, opening trunks, closing trunks, opening and closing a sunroof or moon roof. Thus, the on-board intelligence system may cause the opening & closing of those mechanical portions of the car/vehicle. The cloud-based package-to-and-from-a-vehicle-service is hosted on a cloud-based provider site that contains one or more servers, including the cloud-based server, that cooperate with one or more databases to store the data and reference information needed to control and track the package exchange process, to speed up the package delivery and pick-up process, and to ensure security for the package exchange process. The cloud-based package-to-and-from-a-vehicle-service is coded to utilize a protocol, including HTTP, to engage in a request and response cycle with either i) a mobile device application resident in a client device, ii) a web-browser application resident in the client device, or iii) both. The cloud-based package-to-and-from-a-vehicle-service has one or more routines to automate the package to and from vehicle delivery. The cloud-based package-to-and-from-a-vehicle-service has one or more open application programming interfaces to standardly exchange information between the servers of two or more package delivery sites and/or the servers of two or more OEM 'remote access/connectivity' systems such as an OEM telematics system. (See FIG. 5 for an example class diagram 500 of an embodiment of an application programming interface for the alternative package pickup and delivery system.) The telematics systems are configured to have wireless communications between a server in the cloud and a given vehicle. A hardware module, such as a telematics module, in the vehicle then causes electromechanical actions within that given vehicle in order to allow the cloud-based package-to-and-from-a-vehicle-service to access a plurality of different kinds of vehicles, manufactured from a number of different manufactures. An example telematics module may cooperate with or be part of a navigation system in the vehicle. The cloud-based package-to-and-from-a-vehicle-service has a communication module scripted to establish a communication link with a communication terminal of either or both of the telematics systems or the package delivery sites via a communication network. The cloud-based package-to-and-from-a-vehicle-service has an additional communication module scripted to exchange information with a delivery application on a client device in order to send or receive information from a delivery person. The cloud-based package-to-and-from-a-vehicle-service has an additional communication module for a user of the target vehicle having a package picked up or delivered to that vehicle, which is scripted to exchange information with a mobile application or desktop application on a client device. The package may be a retail shop item, flowers, perishables, tobacco and alcohol, postal letters, food or other consumable items, and other similar deliverable items. The vehicles include but are not limited to automobiles, trucks, vans, motorcycles, and other similar transportation mechanisms. The OEM 'remote access/connectivity' systems can include manufactures, such as Tesla Motors, who have backend servers that directly communicate with a telematics module in the vehicle. An onboard actuation module in the target vehicle may be one of i) a telematics module installed in the target vehicle or ii) a dongle module having a Wi-Fi or cellular communication circuit configured to establish a secure communication with the cloud based server and an electro-mechanical activation circuit configured to cooperate with a fault and diagnostic module installed in the target vehicle.

FIG. 3A illustrates an example sequence of numbered steps in diagram 300. The numbered steps (1) through (18) are described below.

(1) The User (customer) 312 uses either a mobile application 254 on their client device (e.g., a mobile phone) or accesses a retailer's website via a browser on a desktop application 350 on their client device. The retailer's website 258 collects order information including the products selected. The client device submits order and shipping information via the mobile application to the retailer's website, in the case of delivering to a vehicle, the shipping information includes the vehicle VIN. The user interface of the retailer's website offers the alternative delivery destination of the consumer's/user's vehicle 252 as a delivery destination. Note, the retailer's website user interface may show the alternative delivery destination of the consumer's/user's vehicle and an additional monetary charge may be associated with this alternative delivery destination. The additional monetary charge may be charged on a per delivery instance basis or based on a subscription basis.

(2) The retailer's website 258 sends shipping information to the package-delivery-entity-system 302, such as FedEx.

(3) The package-delivery-entity-system 302 sends confirmation including Tracking Number to the User/customer 312 on their client device application 254 or 350. FIGS. 2B, and 3A-3C show the mobile application 254 on a mobile device of the user as well as the desktop application 350 on a desktop/laptop device of the user 312.

(4) The package-delivery-entity-system 302 sends a notification to the package-to-and-from-the-vehicle-service cloud system 340, including Tracking Number and VIN via the standardized open application programming interface. The notification including the shipping Tracking Number and VIN are stored in the databases 275 of the package-to-and-from-the-vehicle-service cloud system 340.

(5) The package-to-and-from-the-vehicle-service cloud system 340 sends a notification to either the mobile application 254 or the desktop application 350 on their client device and confirms with the User their desire to have a package shipped to their vehicle with the Tracking Number and VIN for the package delivery. The confirmation notice also acts as a security mechanism to ensure that the user did in fact elect to have a package delivered to their vehicle 252.

(6) The User supplies a response into either the mobile application 254 or the desktop application 350 on their client device to send permission (User name and Password) for the telematics system (module), such as OnStar, to the package-to-and-from-the-vehicle-service cloud system 340. The User name and Password for the telematics module of the target vehicle can be sent encrypted such that the package-to-and-from-the-vehicle-service cloud system 340 may not discover it. The package-to-and-from-the-vehicle-service cloud system 340 has a multiple step, such as a two-phase, verification mechanism. The cloud-based infrastructure is scripted to validate authorization for the package delivery service to a registered owner's vehicle. The source of initiating the request to open up the car is verified twice as a delivery order key coming from a package delivery entity 302 is verified to match the initial request coming from the package-to-and-from-the-vehicle-service as well as the car actuation virtual key coming from the telematics system 310, which both are verified to match the initial request coming from the package-to-and-from-the-vehicle-service cloud system 340. (See FIGS. 9A-9D on block diagrams 900, 930, 970, and 990 of embodiments of the multiple paired virtual keys and security authorization notices used by the package-to-and-from-a-vehicle-service.)

The details from the package delivery entity system 302 associated with the delivery key have to match the details of the initial request submitted by the package-to-and-from-the-vehicle-service and are then sent over to the package delivery entity system 302. Likewise, the details associated with the car actuation key from the from telematics entity system 310 have to match the details of the initial request submitted by the package-to-and-from-the-vehicle-service cloud system 340 and are then sent over to the telematics entity system 310. The package-to-and-from the-vehicle-service (GPS-based proximity system) stores these details in a database 275, tracks the expected delivery vehicle and knows the location of the target vehicle 252, and after determining its proximity is close, then the virtual key will allow for the unlocking of the vehicle 252.

(7) After the package arrives at the same city, the package delivery entity system's delivery person 304 uses the package delivery application 315 in their client device to send the Tracking Number to the package-to-and-from-the-vehicle-service in order to obtain the vehicle's information including its current location information. FIGS. 3A and 3C show a package delivery application 315 on the client device of the delivery person 304.

(8) The package-to-and-from-the-vehicle-service in the cloud 340 sends a request via the one or more open application programming interfaces to the OEM backend of the telematics entity system 310 for the vehicle's current GPS location information using its VIN. (See FIGS. 7A and 7B on embodiments of the GPS-based control and tracking mechanisms used for delivery to or pick-up from the vehicle.)

(9) The telematics system OEM backend site 310 communicates with the vehicle's navigation system and sends back the vehicle location information from the vehicle's navigation system via the one or more open application programming interfaces to the package-to-and-from-the-vehicle-service cloud system 340. The package-to-and-from-the-vehicle-service cloud system 340 stores this information in its database.

(10) The package-to-and-from-the-vehicle-service cloud system 340 responds to the package delivery application 315 in the client device of the delivery person 304 with the target vehicle's location information. In an embodiment, the GPS coordinates of the target vehicle 252 may not be sent to the package delivery application 315 in the client device of the delivery person 304 and the package-to-and-from-the-vehicle-service cloud system (geo-proximity VAAS) 340 may solely track the distance between the delivery vehicle (truck) 322 and the target vehicle (car) 252.

(11) Upon approaching vehicle 252, the package delivery application 315 in the client device of the delivery person 304 can send a request to the package-to-and-from-the-vehicle-service cloud system 340 to wake up the vehicle 252 by either automatically detecting a close proximity by the first threshold distance between the package delivery vehicle 322 and the target vehicle 252 or can be prompted by the delivery person to send the request. Alternatively, the distance between the package delivery vehicle 322 and the target vehicle 252 can independently be monitored by the package-to-and-from-the-vehicle-service cloud system 340 and the request can be sent without delivery application 315 or delivery person 304 involvement. The vehicle's telematics module 310 may be in a sleep-mode as this prevents battery drain when vehicle is not in use and thus the vehicle's telematics module needs to be sent a wake up notice. The package-to-and-from-the-vehicle-service cloud system 340 via the one or more application programming interfaces sends one or more wake up requests to the telematics system OEM Backend 310 in order for the telematics system OEM Backend 310 to wake up the vehicle 252. Alternatively, the GPS based proximity control routine in the package-to-and-from-the-vehicle-service cloud system 340 can calculate the distance between the delivery vehicle 322 and the target vehicle 252 and send the wake up message. In an embodiment, the wake up message can be initiated either manually by the delivery person 304, or automatically by the GPS based proximity control routine in the package-to-and-from-the-vehicle-service cloud system 340.

Additionally, the distance between the GPS coordinates of the delivery vehicle 322 having the delivery application 315 resident in a client device in the delivery vehicle and the target 252 vehicle's GPS coordinates as periodically fed back by the telematics system OEM Backend 310 is monitored and compared by a GPS based proximity control routine in the package-to-and-from-the-vehicle-service cloud system 340.

(11A) The GPS based proximity control routine in the package-to-and-from-the-vehicle-service cloud system 340 via the one or more application programming interfaces sends one or more wake up requests to the telematics system OEM Backend 310 to wake up the target vehicle as the package delivery (e.g., FedEx) truck 322 arrives near the target vehicle 252. However, without the advanced sequence of wake up requests, the vehicle telematics control may be in sleep mode and a delivery driver might be forced to wait 10 minutes or more to unlock the door. This wake up control insures an Unlock Vehicle command will execute immediately when the package delivery truck 322 arrives since the vehicle is awake. In order to prevent a delay due to in-vehicle power saving mode, the vehicle's telematics module is sent a command (e.g., send your GPS coordinates) to execute the command before the package delivery truck arrives at the location of the target vehicle 252 to keep the target vehicle 252 awake so that the target vehicle 252 respond immediately to a command to unlock the door (see, for example, command 724 of FIG. 7A). This improves productivity since the vehicle 252 can be opened immediately when the package delivery truck 322 arrives, since the vehicle is awake and ready to accept commands. Note, in an example, for security, package-to-and-from-the-vehicle-service cloud system 340 will grant access to the vehicle only once. Consequent requests will not unlock the vehicle even if correct virtual key and valid time window are present.

(11B) A GPS-based proximity control routine in the package-to-and-from-the-vehicle-service cloud system 340 will also send a request via the one or more application programming interfaces to the telematics system OEM Backend 310 to send a command to cause a localized alert in the target vehicle so that the vehicle can blink the vehicle's lights and honk its horn to alert the delivery driver directly to the target vehicle's location (see, for example, command 725 of FIG. 7A and command 762 of FIG. 7B), in order to save time and aid in locating the target vehicle within rows of parked cars. Alternatively, the package-to-and-from-the-vehicle-service cloud system 340 itself can be scripted to send a command directly to the vehicle's telematics module to blink lights and honk its horn to alert delivery driver directly to vehicle's location. This ensures the designated target vehicle is identified properly and increases efficiency of delivering or picking up of the package.

(12) Optionally, the GPS based proximity control routine of the package-to-and-from-the-vehicle-service cloud system 340 waits for a confirmation from the package delivery application 315 that the vehicles driver 304 has located the target vehicle 252. The GPS based proximity control routine composes a correct request command and sends the request via the one or more application programming interfaces to the telematics system OEM Backend 310 to send a command to the intelligent vehicle's telematics module in the vehicle 252 to open the trunk of the vehicle or some other electro-mechanical actuation of a window, sunroof, or other opening to a secure compartment of the target vehicle 252 for placement of the package.

(13) Upon opening trunk, the package delivery person 304 picks up or stores the package into the vehicle, and closes the trunk. Optionally, the delivery person 304 can send a notification of delivery or pickup to the package delivery system 302.

(14) The package delivery entity system's delivery person 304 sends confirmation of the package delivery/pickup and the securing of the target vehicle 252 via the delivery application 315 on the client's device to the package-to-and-from-the-vehicle-service cloud system 340. Alternatively, the delivery application 315 on the client's device of the delivery person can be configured to monitor for the confirmation sent by the package delivery person 304 to the package delivery system 302 and automatically send a package delivery/pickup confirmation to the package-to-and-from-the-vehicle-service cloud system 340.

(15) After receiving a confirmed delivery of the package from the package delivery application 315 in the delivery person's client device, the GPS-based proximity control routine in the package-to-and-from-the-vehicle-service cloud system 340 can receive GPS coordinates from the delivery application 315 in the delivery person's client device and resume monitoring the delivery person 306. The GPS based proximity control routine performs distance monitoring to recognize when the delivery driver is departing and then is scripted to verify that the target vehicle 252 is locked and to avoid the delivery person leaving an unlocked vehicle. The package-to-and-from-the-vehicle-service in the cloud system 340 checks the lock status of the target vehicle 252 by sending a request to the telematics system's OEM backend 310.

(16) As described above, the GPS based proximity control routine in the package-to-and-from-the-vehicle-service cloud system 340 sends a request via the one or more application programming interfaces to the telematics system OEM Backend 310 to send a command to the intelligent telematics module in the vehicle 252 to check the lock status and to confirm the vehicle's doors/trunk is both closed and locked. The telematics system's OEM backend 310 also responds back with a lock confirmation that the vehicle's doors/trunk is both closed and locked, or does not confirm lock status. If not confirming, the GPS-based proximity control routine in the package-to-and-from-the-vehicle-service cloud system 340 sends a request via the one or more application programming interfaces to the telematics system OEM backend 310 to send a command to the intelligent vehicle's telematics module in the vehicle 252 to close and lock the vehicle's doors/trunk. This feature improves security to insure the vehicle 252 is locked after departure and is not left unlocked.

Note, the GPS proximity application is scripted to perform multiple actions including i) waking up a vehicle via its associated telematics system ii) facilitating for the electro mechanical operations in the vehicle to occur, such as unlocking/locking doors, opening/closing windows, opening and unlocking/closing and locking a trunk, opening/closing sunroof, and iii) detecting when the delivery or pick up of the package in vehicle is at a certain distance away from the target vehicle, then the vehicle should be secure at that point. In one embodiment, the GPS based proximity control routine in the package-to-and-from-the-vehicle-service cloud system 340 performs the above actions by sending requests via the one or more application programming interfaces to the telematics system OEM Backend 310.

(17) The package-to-and-from-the-vehicle-service cloud system 340 sends delivery confirmation to the User on either the mobile application 254 or the desktop application 350 on their client device.

(18) The package delivery entity system 302, optionally, sends a delivery notice message to the User 312.

A geo-proximity vehicle alert and access system 340 includes a cloud based server which has a GPS-based proximity system to control and track a package exchange process, to speed up a package delivery and pick-up process, and to ensure security for the package exchange process.

Alternatively, a geo-proximity vehicle alert and access system for at least one of i) package delivery to a vehicle and ii) package pickup from the vehicle, includes a cloud based server having at least one processor to execute instructions associated with, and a GPS-based proximity system to control and track multiple actions. The actions include as follows:

1) a first module that is configured to monitor and track a GPS based proximity between a client device associated with package carrier's vehicle 322 and a target vehicle 252. The client device has an application resident in the client device to establish communication with the cloud based server and transmit its current GPS coordinates; and 2) a second module that is configured to initiate a request to an on-board intelligent control system installed in the target vehicle to perform electro mechanical operations in the target vehicle 252 based on the monitored GPS based proximity between the client device associated with package carrier's vehicle 322 and a target vehicle 252.

The GPS-based proximity system of the geo-proximity VAAS 340 is configured to receive both current GPS coordinates of a package carrier's vehicle 322 and current GPS coordinates of a target vehicle 252 for at least one of package delivery to the target vehicle and package pick up from the target vehicle. The GPS-based proximity system is further configured to send to the target vehicle 252 one or more commands: 1) to wake-up an on-board telematics module in the target vehicle while in a close proximity established by a first threshold distance between the package carrier's vehicle and the target vehicle (see, for example, wake-up call point 702 on the timeline of FIG. 7A), 2) to give an alert from the target vehicle 252 while in a close proximity established by a second threshold distance between the package carrier's vehicle and the target vehicle (see, for example, flash lights/honk horn point 704 on the timeline of FIG. 7A), 3) to unlock the target vehicle 252, and 4) to lock the target vehicle 252 after receiving a confirmation of the package exchange process. The GPS-based proximity system is configured to establish the first threshold distance between the package carrier's vehicle 322 and the target vehicle 252 before initiating a request from the on-board intelligent control system in the target vehicle.

Therefore, the target vehicle's on-board telematics module is configured to 1) send data including GPS coordinates of the target vehicle 252 to a server of an OEM telematics provider 310, and 2) receive one or more commands from the server of the OEM telematics provider 310. The server of the OEM telematics provider is configured to send the GPS coordinates of the target vehicle to the cloud based server with the GPS based proximity system. Also, the one or more processors in the cloud based server site are configured to calculate the first threshold distance, and then issue a request to a server of the OEM telematics provider 310 to issue the command to wake up the telematics module by pinging the telematics module with intervals shorter than a predefined idle time before going to sleep of the telematics module. As an example, the idle time before going to sleep of the on-board Telematics module of the target vehicle 252 can be between 5 to 20 minutes (e.g., 10 minutes).

Additionally, the on-board telematics module of the target vehicle 252 is coupled to an intelligent control system in the target vehicle. The cloud based server is configured to send commands to the on-board telematics module and to the intelligent control system of the target vehicle via communication with the telematics module in the target vehicle through an OEM telematics provider 310. The commands include waking up the telematics module and performing mechanical actions of locking and unlocking the target vehicle, opening and closing doors, and giving an alert by the target vehicle 252. The alert includes one or a combination of 1) activating one or more lights of the target vehicle, 2) activating an alarm system of the target vehicle, and 3) honking a horn of the target vehicle 252. In an embodiment, the on-board telematics module can be coupled to an input port of an on-board diagnostics system of the target vehicle.

FIG. 3B illustrates in diagram 330, a portion of the sequence of numbered steps describe above for diagram 300. (5) The user 312 receives a notice from the package-to-and-from-the-vehicle-service cloud system 340 on either the mobile application 254 or the desktop application 350 on their client device to confirm a desire for a package to be shipped to their vehicle 252. (6) The user 312 confirms and supplies a response into either the mobile application 254 or the desktop application 350 on their client device to send permission (User name and Password) for the telematics system 310, to the package-to-and-from-the-vehicle-service cloud system 340. (10) The package-to-and-from-the-vehicle-service cloud system 340 sends the target vehicle's GPS location data to the package delivery application 315 in the client device of the delivery person 304. (11) Upon approaching the target vehicle 252, the package delivery application 315 in the client device of the delivery person 304 either automatically detects a distance between the package delivery vehicle 322 and the target vehicle 252 or can also be prompted by the delivery person to send a request to the package-to-and-from-the-vehicle-service cloud system 340 to wake up the vehicle 252. Alternatively, the distance between the package delivery vehicle 322 and the target vehicle 252 can independently be monitored by the package-to-and-from-the-vehicle-service cloud system 340 and the request can be sent without delivery application 315 or delivery person 304 involvement. (11A) The GPS based proximity control routine in the package-to-and-from-the-vehicle-service cloud system 340 via the one or more application programming interfaces sends one or more wake up requests to the telematics system OEM Backend 310 to wake up the target vehicle 252. (11B) The GPS-based proximity control routine in the package-to-and-from-the-vehicle-service cloud system 340 also sends a request via the one or more application programming interfaces to the telematics system OEM Backend 310 to send a command to cause a localized alert in the target vehicle 252 so that the vehicle can blink the vehicle's lights and honk its horn to alert the delivery driver directly to the target vehicle's location in order to aid in locating the target vehicle 252 within rows of parked cars. (12) The GPS based proximity control routine composes a correct request command and sends the request via the one or more application programming interfaces to the telematics system OEM Backend 310 to send a command to the intelligent vehicle's telematics module in the vehicle 252 to open a door including a trunk, a window, or a sunroof of the target vehicle 252. Consequently, the Telematics provider 310 sends command 334 through channel 320 to the target vehicle 252 to unlock and open the door of the vehicle. (14) The delivery person 304 sends confirmation of the package 306 delivery/pickup and the securing of the target vehicle 252 via the delivery application 315 on the client's device to the package-to-and-from-the-vehicle-service cloud system 340.

FIG. 3C illustrates in diagram 370, a portion of the sequence of numbered steps describe above for diagram 300. (14) The delivery person 304 sends confirmation of the package 306 delivery/pickup and the securing of the target vehicle 252 via the delivery application 315 on the client's device to the package-to-and-from-the-vehicle-service cloud system 340. (15) After a confirmed delivery of the package from the delivery application 315 in the delivery person's client device, the GPS based proximity control routine performs distance monitoring to recognize when the delivery driver 304 is departing. In order to avoid the delivery person 304 leaving an unlocked vehicle, the package-to-and-from-the-vehicle-service in the cloud system 340 checks the lock status of the target vehicle 252 by sending a request to the telematics system's OEM backend 310. Consequently, the Telematics provider 310 checks the lock state of the vehicle 252 by sending a verification command 384 and receiving a verification response through channel 320 to the target vehicle 252. (16) The telematics system's OEM backend 310 responds back with a lock confirmation that the vehicle's doors/trunk is both closed and locked, or does not confirm being locked. (17) After receiving the locking confirmation, the package-to-and-from-the-vehicle-service cloud system 340 sends delivery confirmation to the User 312 on either the mobile application 254 or the desktop application 350 on their client device. Optionally, the package-to-and-from-the-vehicle-service cloud system 340 sends a delivery confirmation 373 via the delivery application 315 to the delivery person 304.

The current GPS coordinates of a package carrier's vehicle 322 is transmitted from GPS-based delivery application 315 either resident in 1) the package carrier's vehicle 322, or 2) a mobile device of a package carrier 304. The GPS-based delivery application is downloadable from a website. Additionally, the GPS coordinates of the target vehicle 252 are transmitted from the telematics module of the target vehicle 252 to the GPS-based proximity system.

High Level Description of the Package-to-and-from-the-Vehicle-Service Processes

Figure 6A:
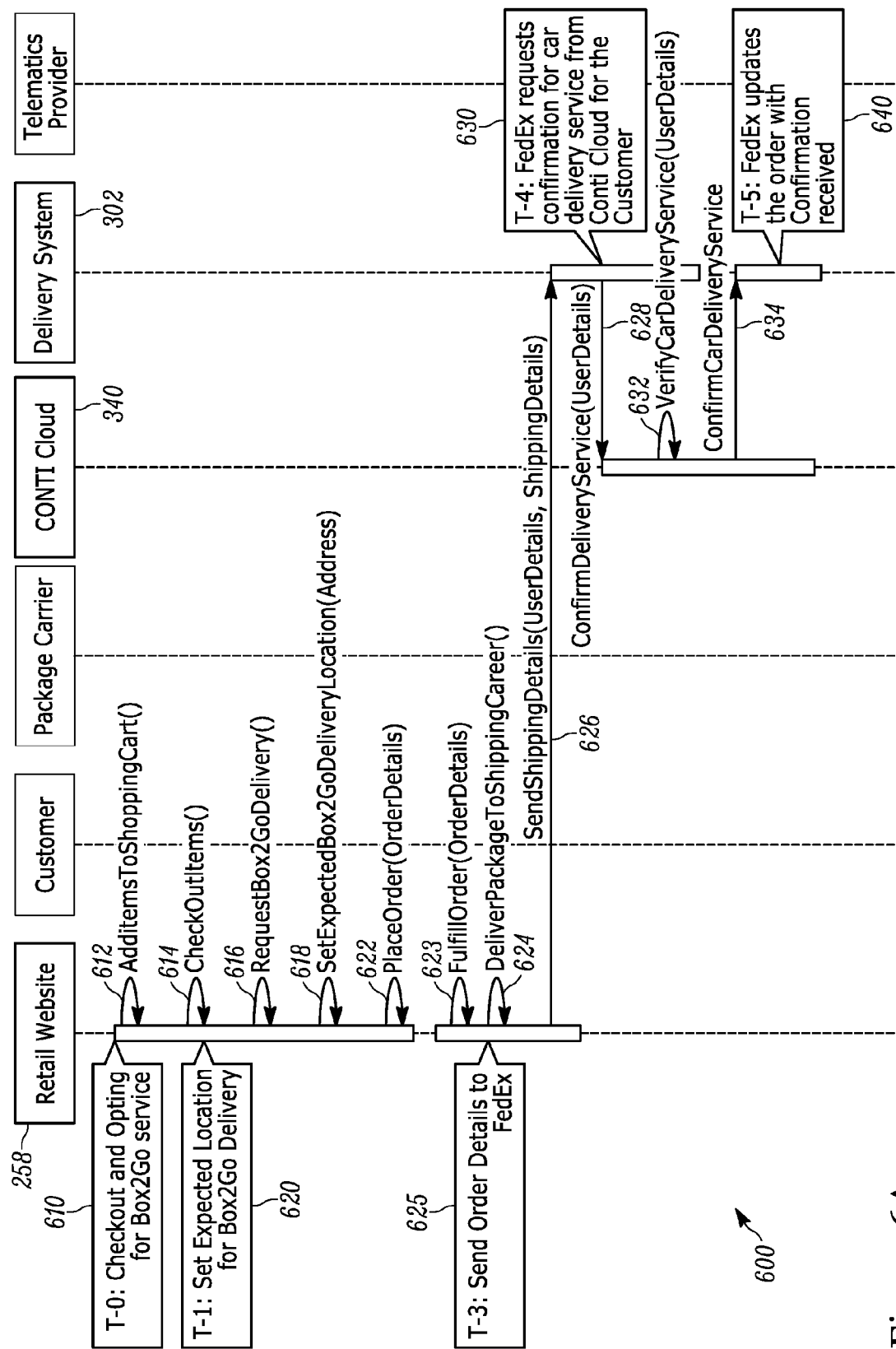
FIGS. 6A-6B illustrate flow diagrams of embodiment of the alternative delivery system.
Figure 6B:
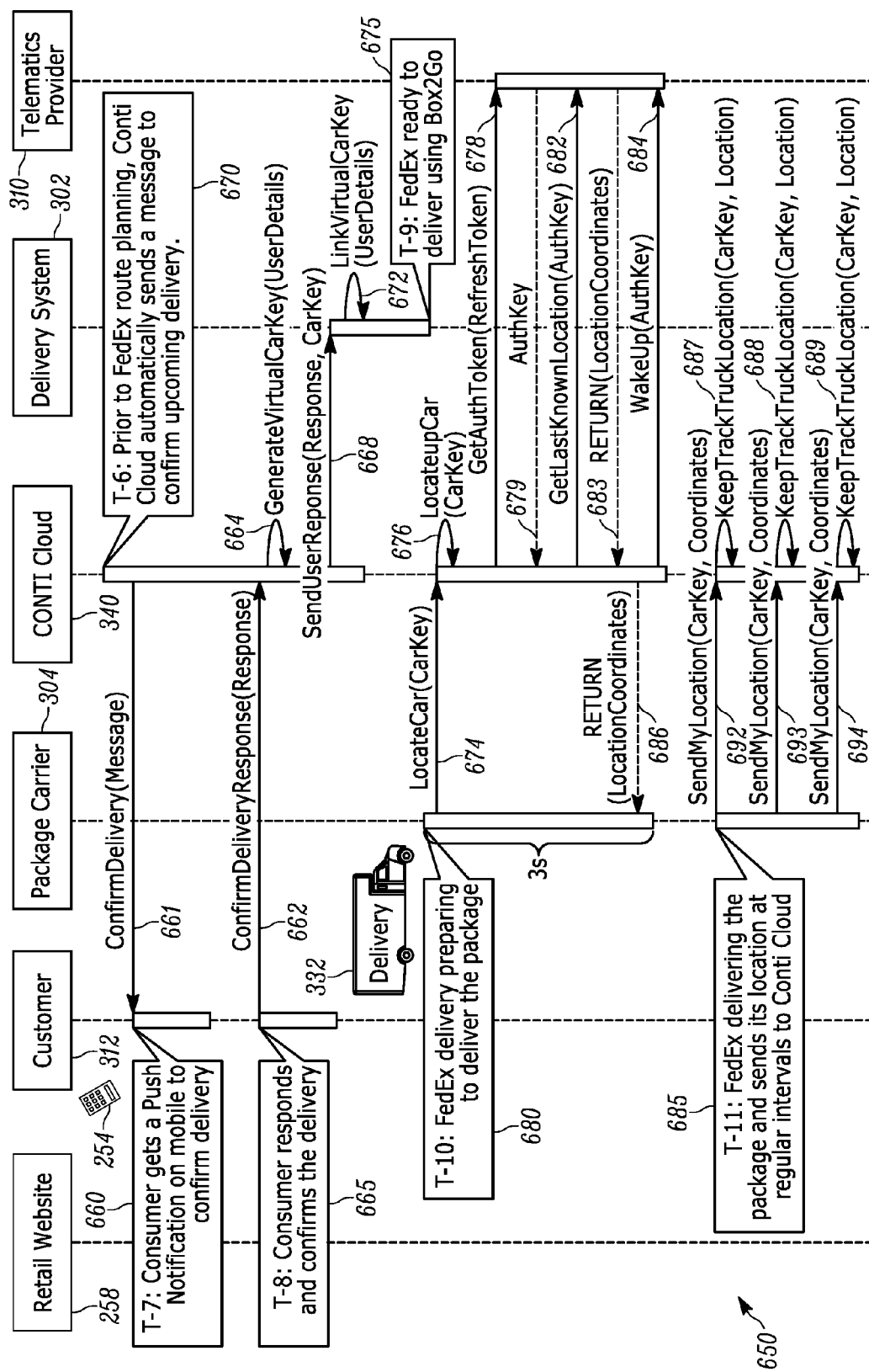

FIGS. 6A-6B illustrate flow diagrams 600 and 650 of embodiment of the alternative delivery system for package delivery to and pick up from the vehicle. The diagram 600 describes a customer/user 312 shopping at a retail website 258. The retail website 258 includes an option of delivery to a mobile location (e.g., a vehicle 252). The user/customer adds items to the shopping cart (612). After being done with shopping the user/customer proceeds to checkout (614). At checkout, the user/customer requests for Box2GoDelivery (e.g., delivery to a vehicle) (616). The customer/user 312 enters the expected delivery location (expected location of the vehicle 252) (618) and places the order (622). Additionally, and the retail website 258 prepares the order details 623 and the shipping details 624 and sends the order details and shipping details to the package delivery system 302 (626). The order details can include user details (user data) such as name and VIN of the vehicle. The shipping details can include the expected location of the vehicle. After receiving a request for delivery to a mobile location (e.g., the vehicle 252), the package delivery system 302 sends the user data to the package-to-and-from-the-vehicle-service cloud system 340 and requests a confirmation of the user and target vehicle (628). The package-to-and-from-the-vehicle-service cloud system 340 verifies the user and target vehicle (632) and sends a confirmation back to the package delivery system (634). The package delivery to and pick up from the vehicle process continues on flow diagram 650. The user receives a confirmation delivery message from the package-to-and-from-the-vehicle-service cloud system (661). For example, on or around the day of delivery, the package-to-and-from-the-vehicle-service cloud system 340 sends a message to the mobile application 254 of the user 312 and asks the user to confirm the details of delivery including, for example, the time and location of the vehicle. The user responds (662). A positive response from the user 312 acts as the user permission to unlock and open a vehicle door. Based on the permission, the package-to-and-from-the-vehicle-service cloud system 340 generates a virtual car key (664) allowing the package carrier 304 to unlock and open the door of the vehicle. The package-to-and-from-the-vehicle-service cloud system 340 sends the virtual car key to the package delivery system (668) and the package carrier system 302 links the virtual car key to the user data (672). On the day of delivery, the package carrier 304 send the virtual car key to the package-to-and-from-the-vehicle-service cloud system 340 and informs about the delivery (674). The package-to-and-from-the-vehicle-service cloud system 340 verifies the virtual car key (676) and sends a request to the Telematics provider 310 and asks for an authorization key (678). The request can include the user account information including username and password and VIN of the vehicle. The Telematics provider 310 responds with an authorization key (679). The package-to-and-from-the-vehicle-service cloud system 340 uses the authorization key and requests for the last know location of the target vehicle (682). The Telematics provider 310 responds with the last GPS coordinates of the target vehicle (683). Optionally, the package-to-and-from-the-vehicle-service cloud system 340 send the last coordinates of the target vehicle 252 to the package carrier (686). The package-to-and-from-the-vehicle-service cloud system 340 which receives the GPS coordinate of the package delivery vehicle 322, monitors the distance between the package delivery vehicle 322 and the target vehicle 252 and using the authorization key sends a wakeup call (684) to the Telematics provider 310 when the package delivery vehicle gets to predefined distance (e.g., closer than the first threshold distance) of the target vehicle. The package-to-and-from-the-vehicle-service cloud system 340 continues to receive the GPS coordinates of the package carrier's vehicle 322 along with the virtual car key (692-694) and calculates the distance between the package delivery vehicle 322 and the target vehicle 252 and monitors the distance (687-689). The virtual car key is used by the package-to-and-from-the-vehicle-service cloud system 340 to check the authenticity of the messages received from the package carrier 304. Likewise, the authorization key is used by Telematics provider 310 to authenticate the messages it receives from the package-to-and-from-the-vehicle-service cloud system 340.

Figure 7A:
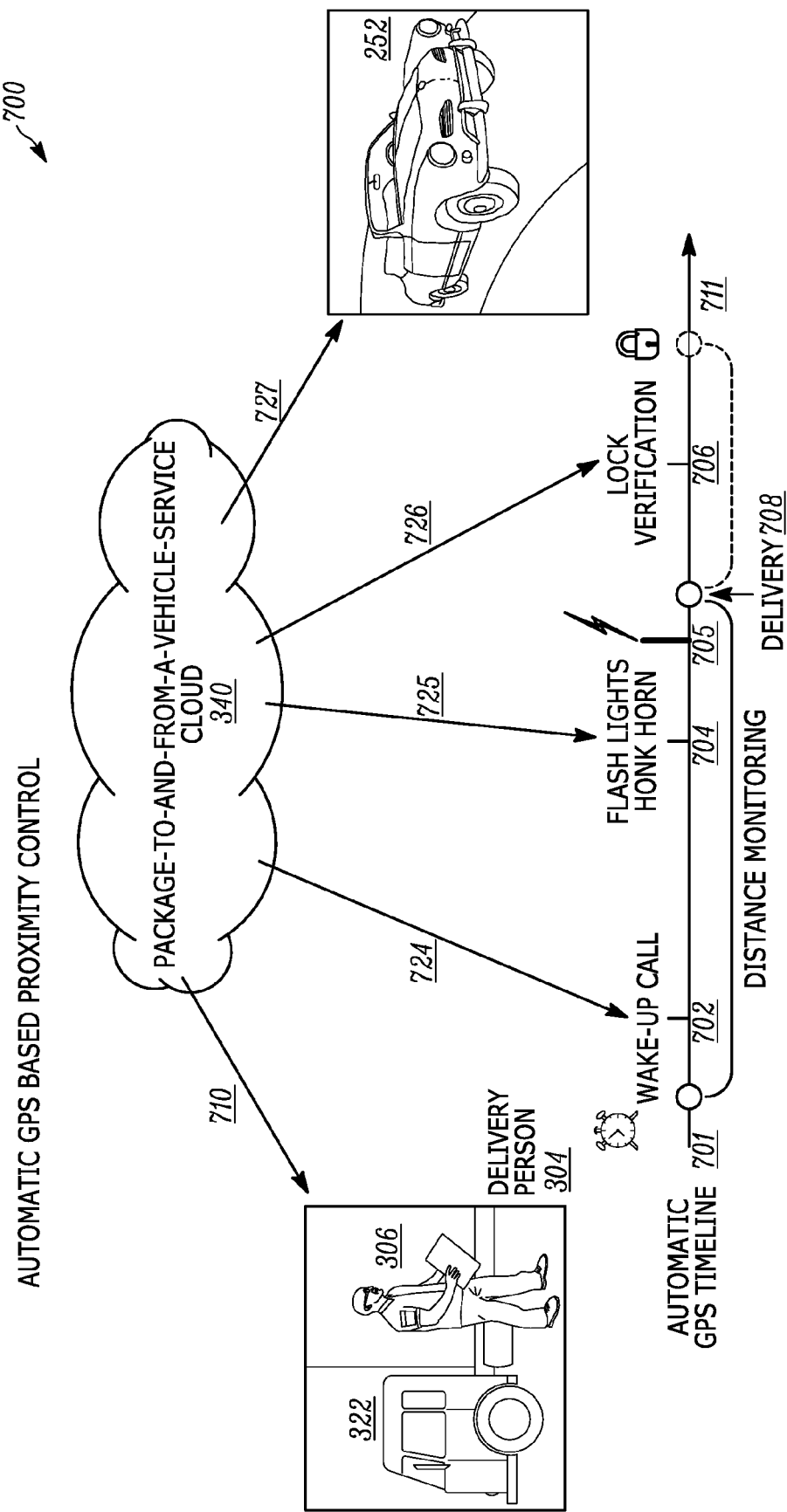
FIGS. 7A and 7B illustrate block and flow diagrams of embodiments of the GPS-based control and tracking mechanisms used for delivery to or pick-up from the vehicle.
Figure 7B:
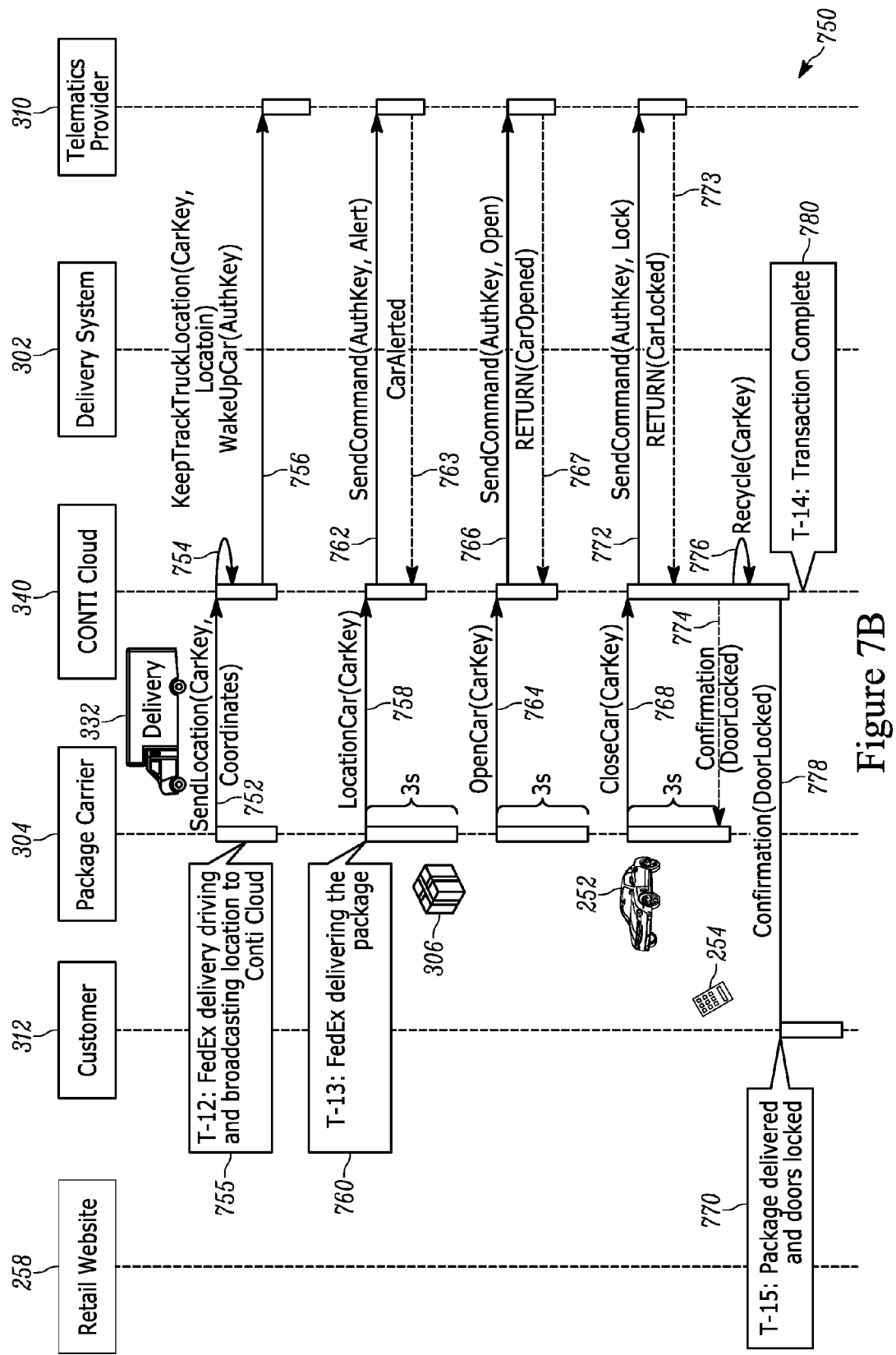
Figure 8B:
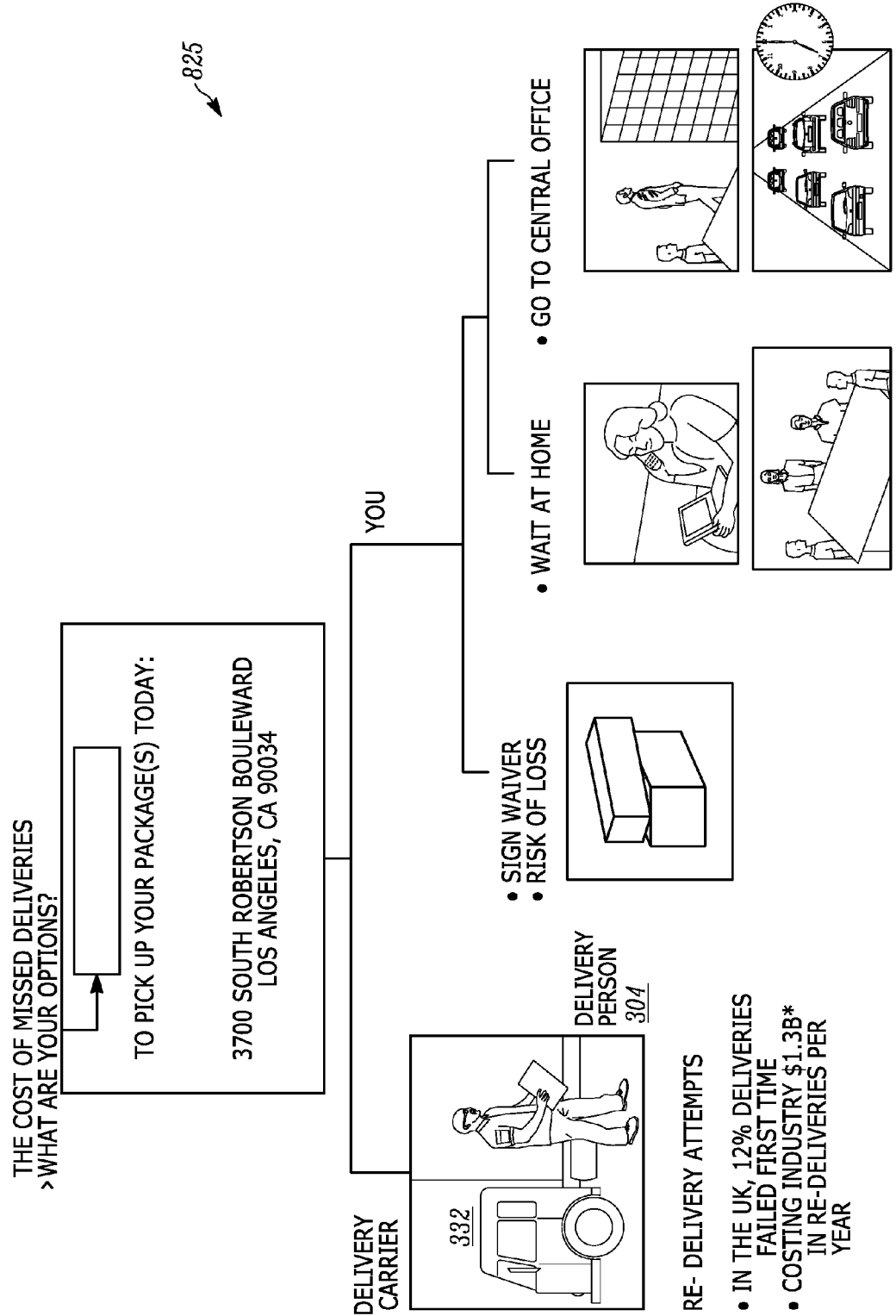
Figure 8C:
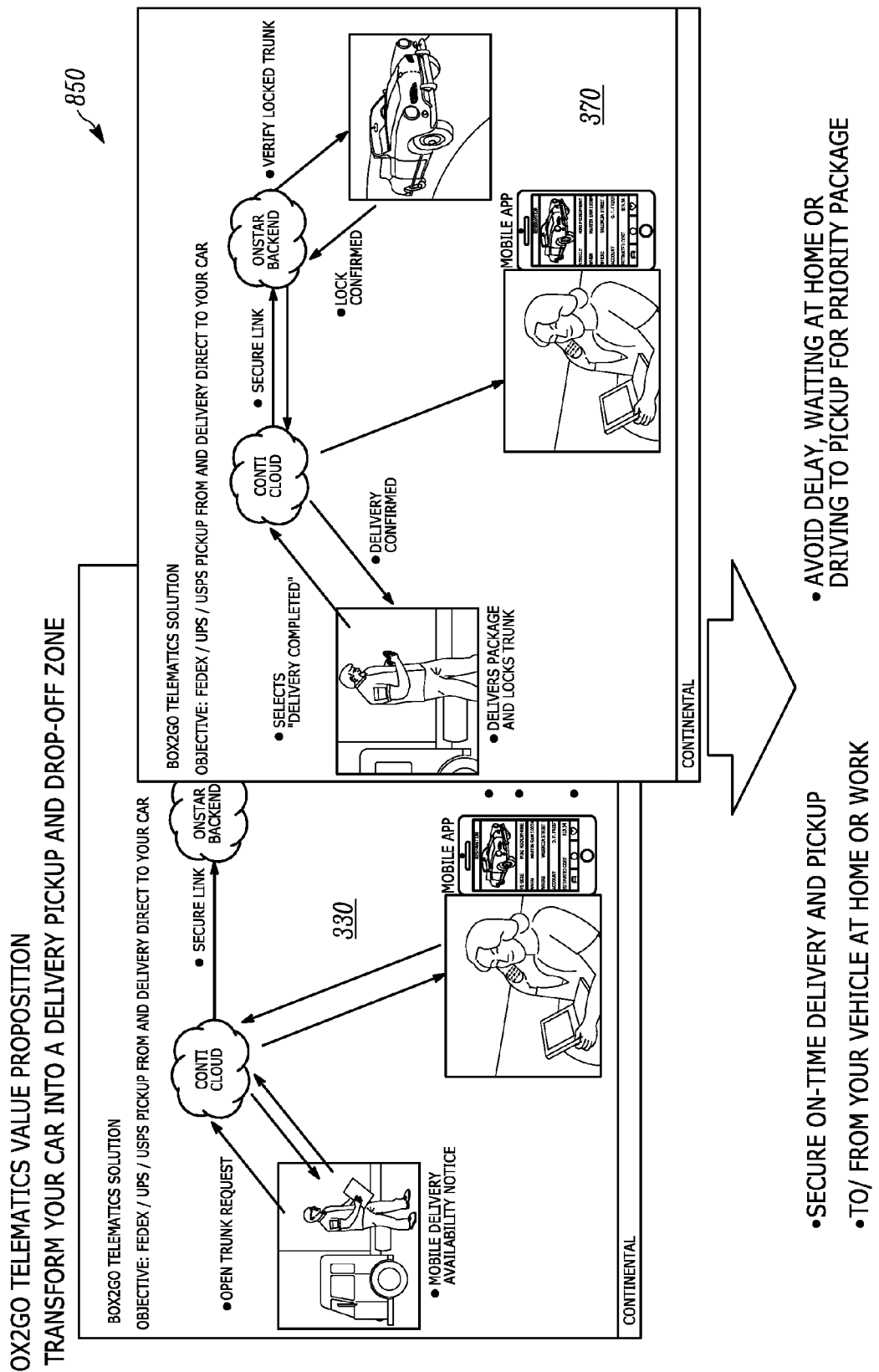
Figure 8D:
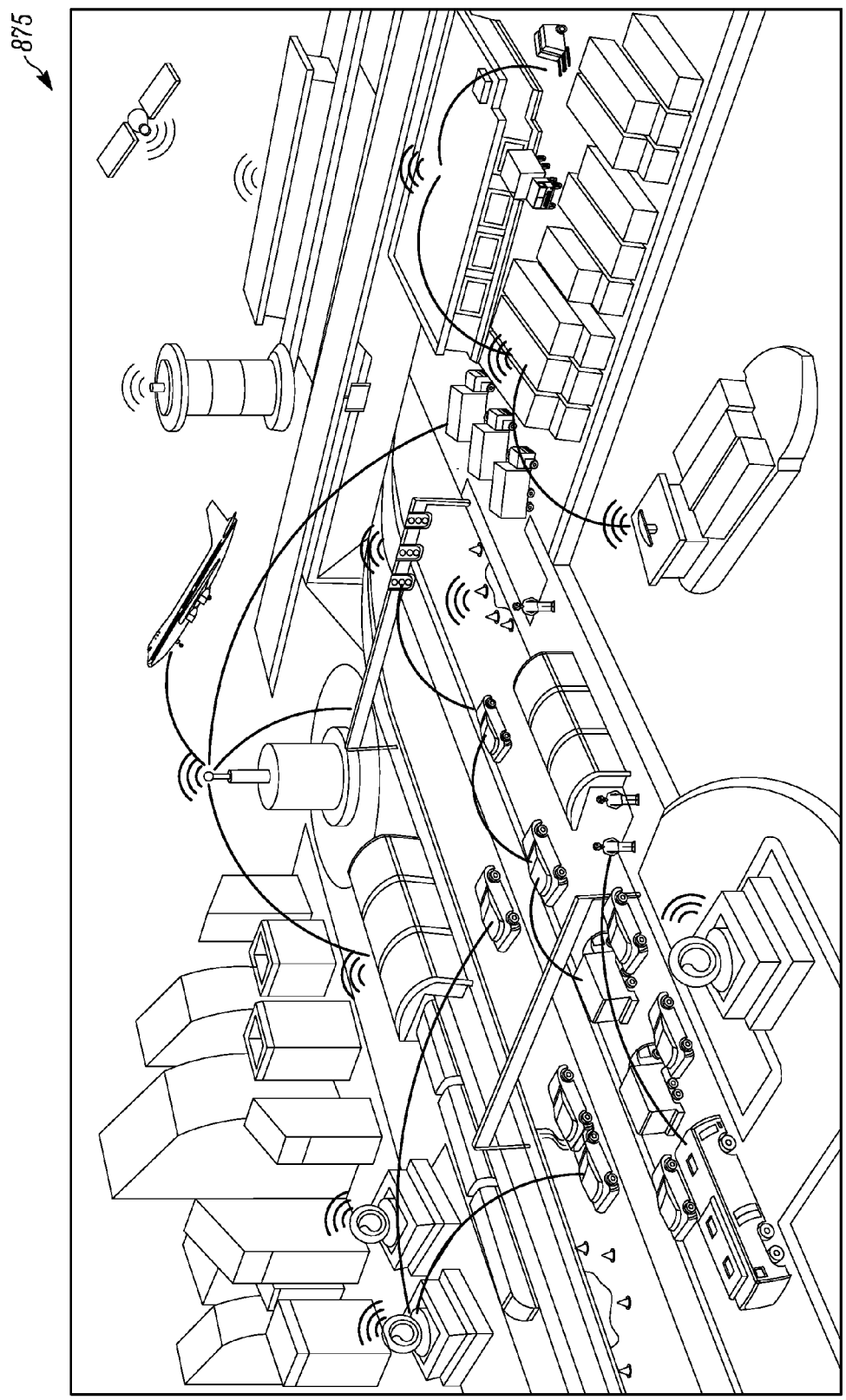
Figure 9B:
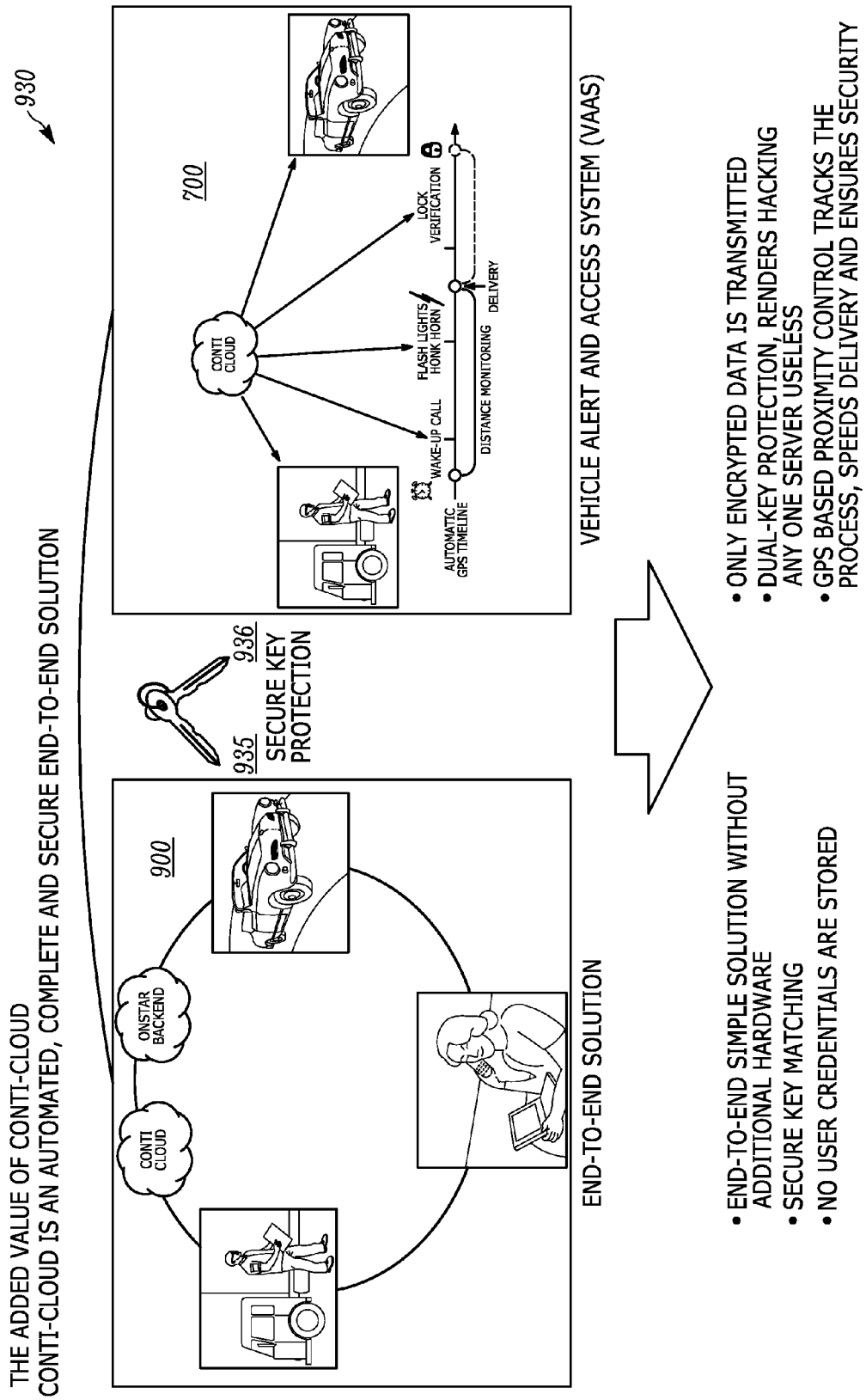
Figure 9C:
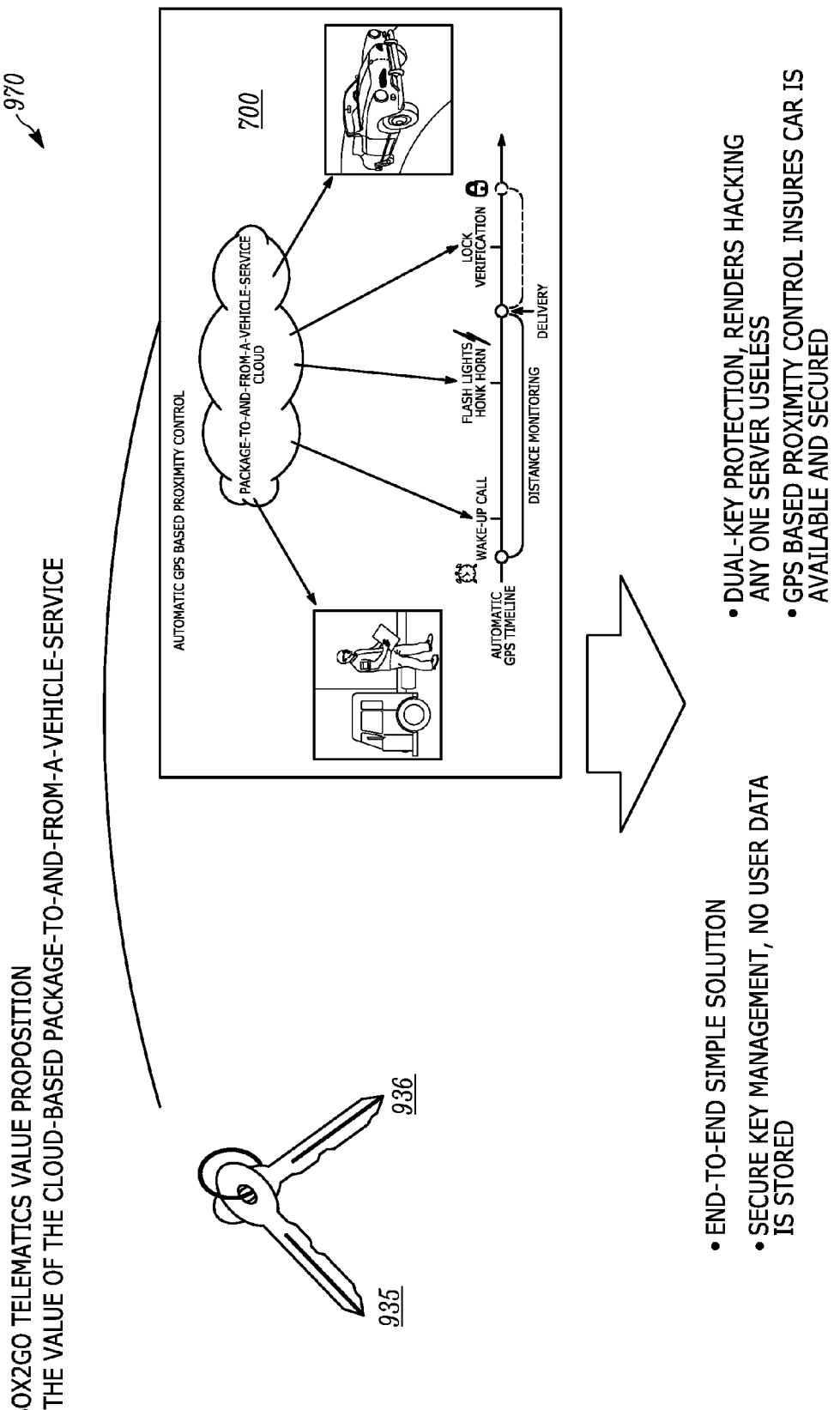
Figure 9D:
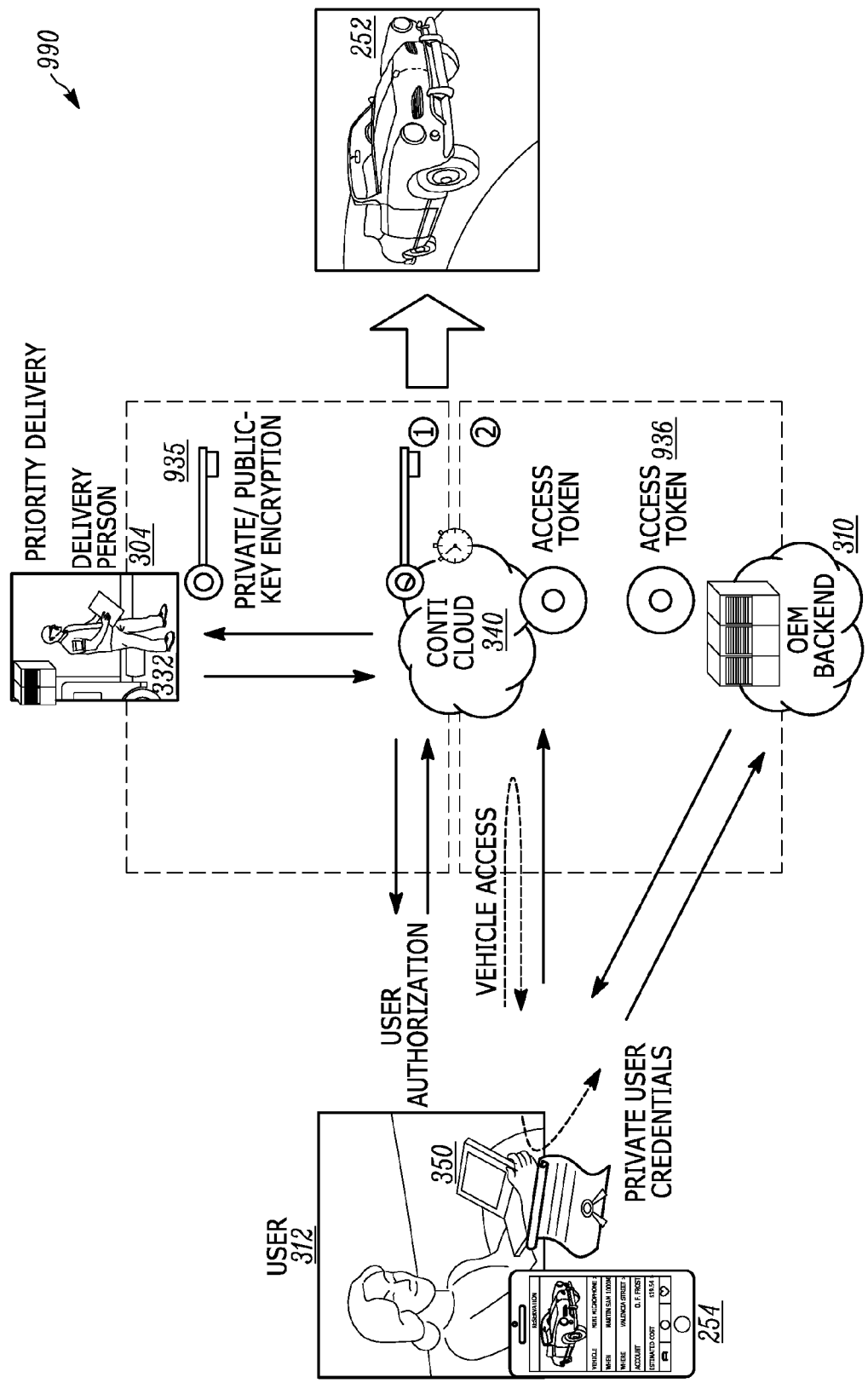

FIG. 7B illustrates flow diagram 750 of the continuation of the package delivery to and pick up from the vehicle process. The package-to-and-from-the-vehicle-service cloud system 340 continues to receive the GPS coordinates of the package carrier's vehicle 322 along with the virtual car key (752) and monitors the distance to target vehicle 252 (754). Using the authorization key, the package-to-and-from-the-vehicle-service cloud system 340 can send more wakeup calls (756) to the Telematics provider 310 to prevent the Telematics module of the target vehicle from going to sleep mode. The package-to-and-from-the-vehicle-service cloud system 340 continues to receive the GPS coordinates of the package carrier's vehicle 322 along with the virtual car key (758) and monitors the distance to target vehicle 252 and when the package carrier's vehicle 322 gets to the vicinity of the target vehicle 252 (e.g., closer than the second threshold distance), the package-to-and-from-the-vehicle-service cloud system 340 sends an Alert request (762) along with the authorization key to the Telematics provider 310 to cause the target car to turn on the lights, sound the horn, or produce other audio or visual alerts such that the delivery person 304 can notice the target vehicle 252. Then the Telematics provider 310 acknowledges the alert request (763) and sends the request to the target vehicle 252. The delivery person 304 find the target vehicle and sends a request (764) along with the virtual car key to the package-to-and-from-the-vehicle-service cloud system 340 to unlock the target vehicle and open a door of the target vehicle. The package-to-and-from-the-vehicle-service cloud system 340 sends the unlock request along with the authorization key to the Telematics provider 310 (766) and then the Telematics provider 310 acknowledges the unlock request (767) and sends the request to the target vehicle 252. The delivery person 304 opens the target vehicle 252 and either delivers a package to the target vehicle or picks up a package from the target vehicle. The delivery person 304 sends a request (768) along with the virtual car key to the package-to-and-from-the-vehicle-service cloud system 340 to confirm delivery/pick up of the package and request to lock the target vehicle. The package-to-and-from-the-vehicle-service cloud system 340 sends the lock request along with the authorization key to the Telematics provider 310 (772) and then the Telematics provider 310 acknowledges the lock request (773) and sends the request to the target vehicle 252 and also sends a lock confirmation to the delivery person (774). The package-to-and-from-the-vehicle-service cloud system 340 further recycles (destroys) the virtual car key (776) and sends a delivery/pickup confirmation (778) to the user 312 via client's mobile application 254 or desktop application 350.

FIG. 7A illustrates block diagram 700 of the timeline of the package delivery to and pick up from the vehicle process. In the timeline, at point 701, the package-to-and-from-the-vehicle-service cloud system 340 begins monitoring the distance between the package carrier vehicle 322 and the target vehicle 252. In one embodiment, the distance monitoring can be initiated by receiving a message from the delivery person 304, by a predetermined time before scheduled delivery, and/or at the beginning of the day of delivery. In order to prevent draining the battery, the Telematics module of a vehicle is usually kept in sleep mode when the vehicle is not operated. In the sleep mode, the Telematics module can wake up for example every 10 minutes and to communicate with the Telematics provider (OEM telematics system 310) and check for any commands to execute. Thus, in sleep mode, the Telematics module cannot instantly execute commands and only execute commands when wakes up. In the timeline, at point 702, a message is sent to the Telematics module of the target vehicle 252 to wake up. The wake up message is executed with delay and thus it is sent when the package delivery vehicle 322 is a predefined distance (or predefined amount of time) away from the target vehicle 252 to give the target vehicle enough time to wake up. In the timeline, at point 704, when the package delivery vehicle 322 is in close vicinity of the target vehicle 252 (e.g., in the same parking lot) an alert message is sent to the target vehicle so that the target vehicle does a mechanical operation such as blowing the horn, flashing the light, or activating the alarm system such that the delivery person 304 can notice the target vehicle. As discussed with respect to FIG. 7B, the command to unlock and open the target vehicle can be sent after the delivery person locates the target vehicle and sends the request 764 to the package-to-and-from-the-vehicle-service cloud system 340. Optionally and to increase security, the command to unlock and open the target vehicle 252, can be sent after the delivery person locates the target vehicle and sends the request 764 and additionally when the delivery truck 322 or the delivery person 304 gets as close as point 705 to the target vehicle. At point 708, the delivery person 304 delivers the package to the target vehicle or picks up the package from the target vehicle. As discussed with respect to FIG. 7B, after delivery, the delivery person 304 sends the request 768 to close and lock the target vehicle. As shown in the timeline, when the delivery truck drives away from the target vehicle 252 and reaches the point 706, a lock verification message is sent to the target vehicle. Optionally, at point 711 a message is sent by the package-to-and-from-the-vehicle-service cloud system 340 to the delivery person 304 informing the lock verification. The GPS coordinates of the package delivery application 315 can be used when the delivery person 304 walks away from the delivery truck 322. As discussed with respect to FIGS. 3A, 6A, 6B, and 7B, the communications (724-727) between the package-to-and-from-the-vehicle-service cloud system 340 and the target vehicle 252 is through the Telematics provider 310.

Additionally, the target vehicle can be sent an unlock command to unlock the target vehicle while in a close proximity established by a third threshold distance that is smaller in preset distance than the second threshold distance between the package carrier's vehicle 322 and the target vehicle 252. FIG. 7A show the timelines. The one or more processors calculate the first threshold distance through the fourth threshold distance. The point 704 corresponds to the second threshold distance and point 705 corresponds to the third threshold distance that is closer to target vehicle than the second distance. The unlocking includes acquiring an unlocking permission by the GPS-based proximity system 340 by satisfying the third threshold distance as well as satisfying a security measure that the issuing of an unlocking command is occurring only within a preset time window. The GPS-based proximity system 340 is then configured to transmit the command to unlock to the onboard actuation module in the target vehicle 252, which then is coded to unlock one or more of the doors including unlocking the trunk of the target vehicle. The onboard actuation module in the target vehicle may also be coded to cause the opening of a sun roof of the target vehicle 252.

The GPS-based proximity 340 system is configured to calculate the fourth distance separation threshold with the one or more processors and then send a command to lock the target vehicle 252 when the fourth distance separation threshold between the client device associated with the package carrier's vehicle 322 and the target vehicle 252 is satisfied. The lock verification is performed after the delivery truck 322 has a minimum fourth threshold distance to the target vehicle to make sure delivery person 304 is leaving the area (see, for example, lock verification point 706 on the timeline of FIG. 7A). The locking includes performing a lock verification to check to see if the doors of the target vehicle 252 are indeed locked by the time the fourth distance separation threshold is satisfied, and then, if not locked, then send a command to the onboard actuation module to lock the target vehicle 252 by locking one or more doors of the target vehicle. Locking may include closing one or more doors of the target vehicle and performing a lock verification. The doors of the target vehicle include a trunk, a sunroof, and a window.

Additionally, the cloud based server 270 of the geo-proximity VAAS 340 includes a first module configured to provide one or more application programming interfaces between the servers of two or more package delivery services 302 and the servers of two or more OEM telematics providers 310. The cloud based server also includes a first input socket to receive a first notification about a request for a package delivery to or pick-up from the target vehicle 252 of a user 312 via the one or more application programming interfaces from a first package delivery service. A second module of the cloud based server is configured to communicate with a database 275 of the cloud based server 270 to store the first notification including a shipping Tracking Number (TN) and a Vehicle Identification Number (VIN) associated with the request and to register the request for the package delivery to or pick-up from the target vehicle 252. A third module of the cloud based server is configured to, upon registering the package delivery to or pick-up from request, send a second notification to the user 312 via either a mobile application 254 or a desktop application 350 on a client device of the user 312 to confirm with the user a desire to have a package with the shipping TN shipped to or picked-up from the target vehicle with the VIN (see, for example, message 661 of FIG. 6B and message 1006 of FIG. 10). A fourth module of the cloud based server is configured to use the one or more application programming interfaces with the two or more OEM telematics providers 310 to establish wireless communications with an onboard telematics module in the target vehicle 252. The fourth module is configured to send a request to a first OEM telematics provider via the one or more application programming interfaces to wake the target vehicle's onboard telematics module when the package carrier's vehicle is in close proximity established by the first threshold distance to a target vehicle matching the VIN (see, for example, message 684 of FIG. 6B and message 1026 of FIG. 10). The fourth module is also configured to send a request to the first OEM telematics provider 310 via the one or more application programming interfaces to unlock the trunk and/or doors of the target vehicle 252 via the target vehicle's onboard telematics module when an indication is received that a delivery person 304 is ready to deliver or pick-up the package (see, for example, message 766 of FIG. 7B and message 1042 of FIG. 10). The fourth module is configured to send a request to the first OEM telematics provider 310 via the one or more application programming interfaces to lock the trunk and doors of the target vehicle 252 via the vehicle's onboard telematics module when a confirmation is received that a delivery person 304 has delivered or picked-up the package (see, for example, message 772 of FIG. 7B and message 1052 of FIG. 10).

Figure 10:
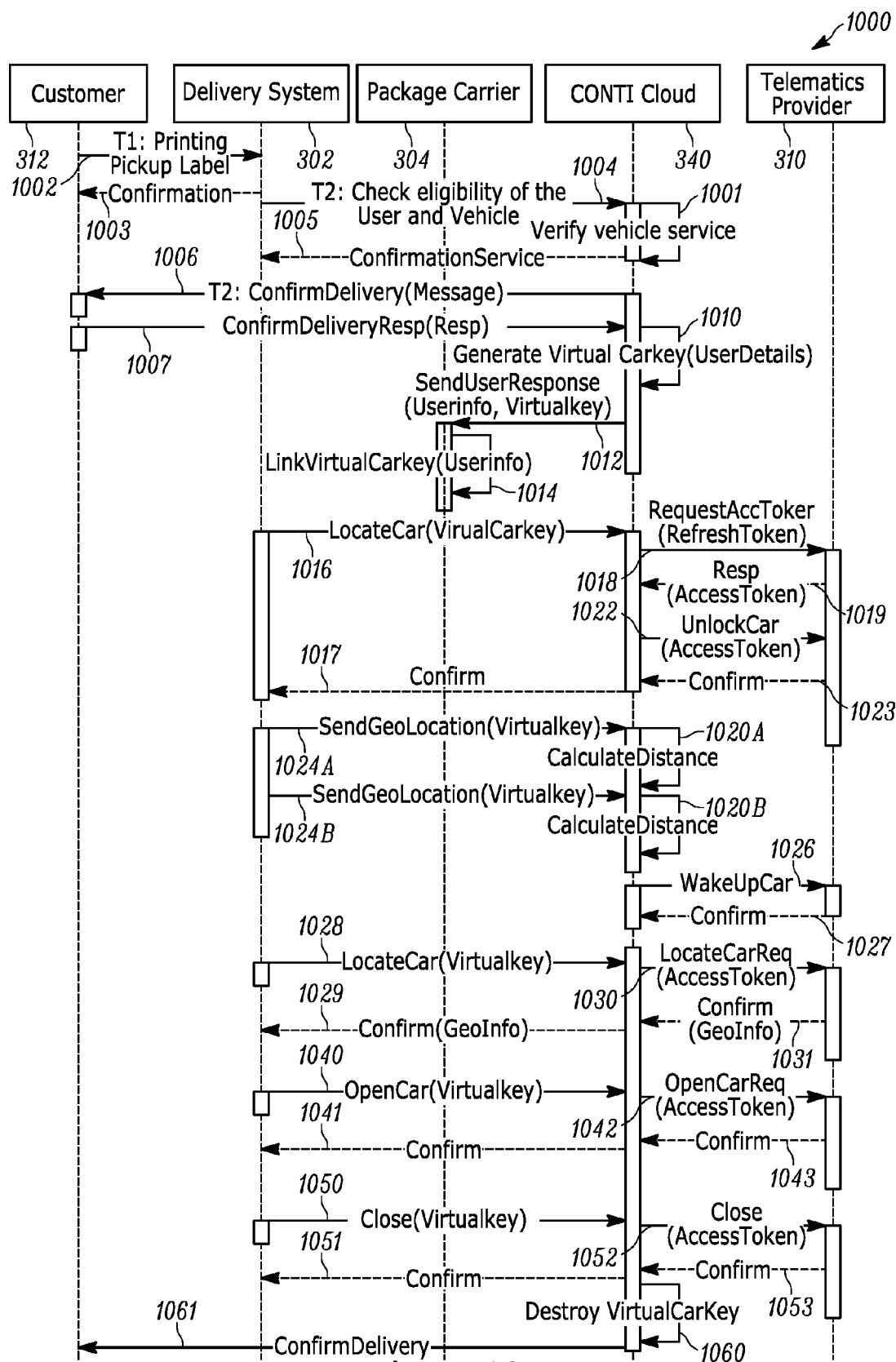
FIG. 10 illustrates a sequence diagram of embodiment of a package pick up from a user of the package-to-and-from-a-vehicle-service.

FIG. 10 illustrates a sequence diagram 1000 of embodiment of a package pick up from a user of the package-to-and-from-a-vehicle-service. The diagram 1000 is similar to the combination of diagrams 600, 650, and 750. A user of the cloud-based package-to-and-from-a-vehicle-service can use the Box2Go application 254 or 350 resident in their client device to arrange a package pickup from their vehicle. The Box2Go application resident in their client device will collect the details and send the information to the cloud-based package-to-and-from-a-vehicle-service. Additionally, and/or alternatively, a package delivery service web site presents a user interface or web page to collect the details for the user to arrange a package pickup from their vehicle. In diagram 1000, the Telematics provider 310 provides an Access Token to the cloud-based package-to-and-from-a-vehicle-service to authenticate the message that it receives from cloud-based package-to-and-from-a-vehicle-service. Likewise, the cloud-based package-to-and-from-a-vehicle-service provides a virtual car key to the package delivery system 302 as well as package carrier 304 to authenticate the messages it receives from the package delivery system 302 and package carrier 304.

Figure 12:
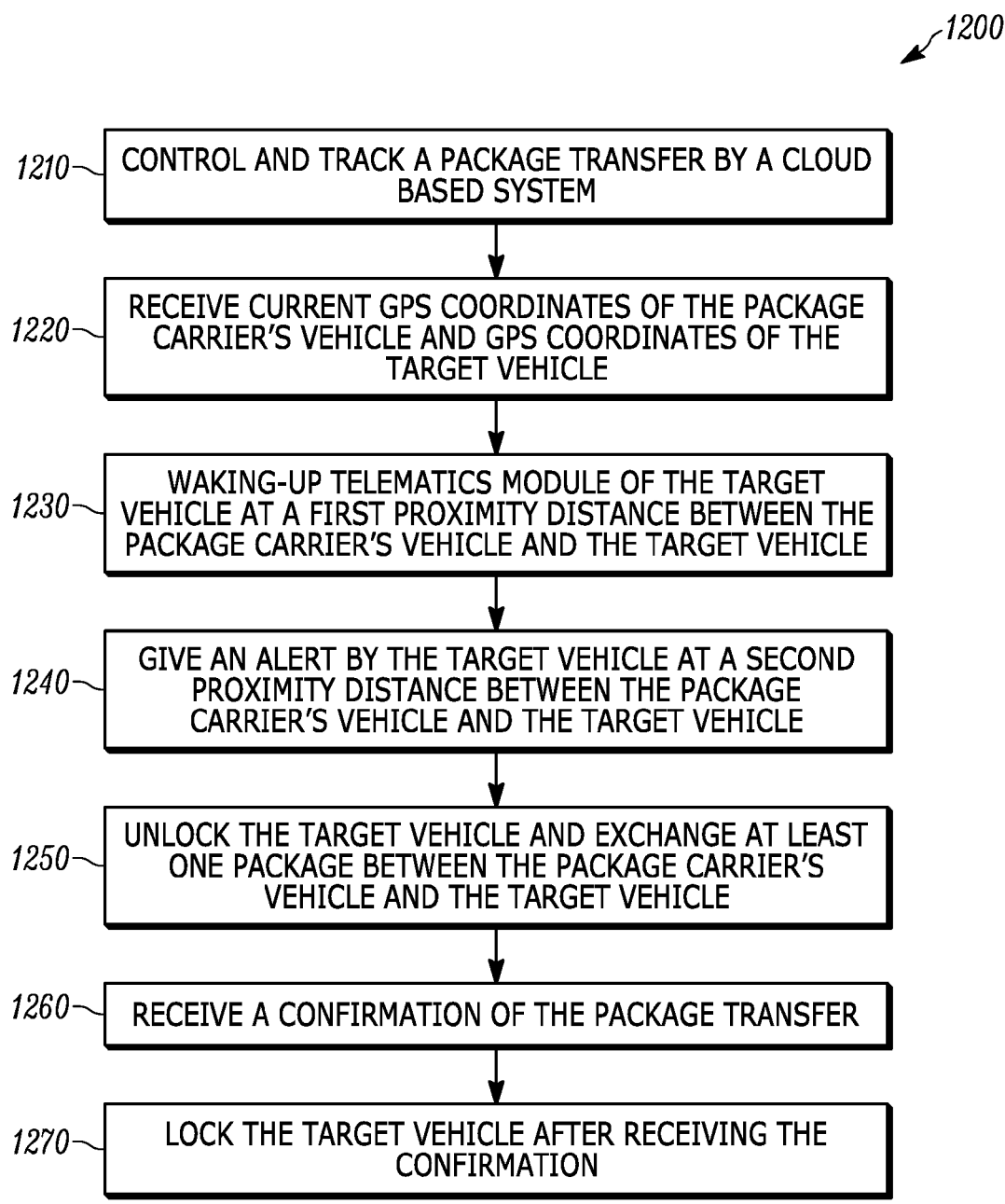
FIG. 12 illustrates a flow graph of an example method of operating a speed delivery, pick-up, and secure package exchange between a package carrier's vehicle and a target vehicle.

FIG. 12 illustrates a flow graph of an example method of operating a speed delivery, pick-up, and secure package exchange between a package carrier's vehicle and a target vehicle. The method 1200 can be used for describing the sequence of numbered steps in diagram 300 or the flow diagrams 600, 650, 750 in FIGS. 6A, 6B, and 7B. A package transfer is controlled and tracked by a cloud based system (1210). As shown in FIGS. 3A-3C, the package-to-and-from-the-vehicle-service cloud system 340 can control and track a package transfer between a target vehicle 252 and the package delivery vehicle 322.

The current GPS coordinates of the package carrier's vehicle and the GPS coordinates of the target vehicle is transmitted from a GPS-based delivery application resident (1220). For example, as shown in FIGS. 3A-3C, current GPS coordinates of the package carrier's vehicle 322 are calculated. A client device installed in the package carrier's vehicle, or 2) a handheld client device that travels with a driver of a package carrier's vehicle sends using package delivery application 315 of the delivery person 304 the GPS coordinates of the package carrier's vehicle. Similarly, the current GPS coordinates of the target vehicle 252 is received through the Telematics provider 310 after the package-to-and-from-the-vehicle-service cloud system 340 sends a request to the Telematics provider 310 as described above with respect FIGS. 3A and 6B.

The telematics module of the target vehicle is woken up at a first proximity distance between the package carrier's vehicle and the target vehicle (1230). As described with respect to FIGS. 3A and 6B, the package-to-and-from-the-vehicle-service cloud system 340 monitors the distance between the package carrier's vehicle 322 and the target vehicle 252. When the distance becomes shorter than a first proximity distance, the package-to-and-from-the-vehicle-service cloud system 340 sends a request to Telematics provider 310 to wake up the target vehicle 252. The wake up calls can be repeated to make sure the target vehicle does not go to sleep mode. In an embodiment the Telematics provider 310 may not send a specific wakeup command but may send another command such as a command to send the GPS coordinates and may repeat this command with intervals shorter than the idle time before going to sleep mode of the Telematics module of the target vehicle to prevent the Telematics module of the target vehicle 252 from going to sleep mode.

An alert is given by the target vehicle at a second proximity distance between the package carrier's vehicle and the target vehicle (1240). The package-to-and-from-the-vehicle-service cloud system 340 continues monitoring the distance between the package carrier's vehicle 322 and the target vehicle 252 and when the distance becomes shorter than a second proximity distance, the package-to-and-from-the-vehicle-service cloud system 340 sends a request to Telematics provider 310 to command the target vehicle 252 to alert the delivery person 304 of the location of the target vehicle by performing one or more actions of honking the horn, flashing the lights, and activating the security system. Additionally or alternatively, the delivery person 304 can initiate a request to the package-to-and-from-the-vehicle-service cloud system 340 for an alert or additional alerts. The alert request is sent by the package-to-and-from-the-vehicle-service cloud system 340 to the Telematics provider 310 where the Telematics provider 310 sends an appropriate command to the target vehicle 252 as described with respect FIGS. 3A and 7B.

The target vehicle is unlocked and at least one package is exchanged between the package carrier's vehicle and the target vehicle (1250). As described with respect to FIGS. 3A and 7B, after locating the target vehicle, the delivery person 304 can initiate a request to the package-to-and-from-the-vehicle-service cloud system 340 for unlocking and opening a door of the target vehicle 252. The delivery person 304 can deliver a package to the target car 252 or pick up a package from the target vehicle. The unlock request is sent by the package-to-and-from-the-vehicle-service cloud system 340 to the Telematics provider 310 where the Telematics provider 310 sends an appropriate command to the target vehicle.

A confirmation of the package transfer is received (1260). After the delivery person 304 delivers a package to the target car 252 or picks up a package from the target vehicle 252, secures the car and sends a package transfer confirmation to the package-to-and-from-the-vehicle-service cloud system 340. In an embodiment, the delivery can only close the door or trunk of the target vehicle and locking may be performed by the Telematics provider 310.

The target vehicle is locked after receiving the confirmation (1270). After receiving the package exchange confirmation from the delivery person 304, the package-to-and-from-the-vehicle-service cloud system 340 sends a lock request to the Telematics provider 310 where the Telematics provider 310 sends an appropriate command to the target vehicle to lock the target vehicle 252.

Registration and Purchase

There are multiple time periods and methods (described below) a customer can select to register with the package-to-and-from-the-vehicle-service. Upon registering, a first database in the one or more databases may be also configured to contain and index information regarding for each user including: User ID and password for the package-to-and-from-the-vehicle-service, User name, email, etc., security questions, vehicle VIN, vehicle model, color and year, and other similar information.

When purchasing a new car at the dealership with a telematics system built into the vehicle the following steps are performed: i) the customer is offered to sign-up for the package-to-and-from-the-vehicle-service, ii) the customer signs up for the Box2Go service application in the cloud-based package-to-and-from-a-vehicle-service using a paper form and the customer downloads the Box2Go mobile app into their client device, iii) the customer logs-in to the Box2Go mobile app at least once to activate the Box2Go service application in the cloud-based package-to-and-from-a-vehicle-service. Next, the cloud-based package-to-and-from-a-vehicle-service automatically tracks the Authentication Key and Refresh Key for the user and stores it as part of the registration.

A customer may register using the Box2Go Application by i) using the Box2Go app to sign up, ii) Box2Go collects the registration information for the telematics system site (e.g. OnStar's Backend site) from the user and passes it to the telematics system site, (Box2Go mobile application or the cloud-based package-to-and-from-a-vehicle-service does not store this information in the cloud system), iii) the telematics system site finishes the registration and returns the Authentication Key and Refresh Key, and lastly iv) the cloud-based package-to-and-from-a-vehicle-service stores the Authentication Key and Refresh Key as part of the registration.

When an already existing User registers, the Box2Go app collects the username and password from the telematics system site customer, Box2Go signs up the customer, and the telematics system site returns the Authentication Key and Refresh Key. The cloud-based package-to-and-from-a-vehicle-service stores the Authentication Key and Refresh Key as part of the registration.

The shopping experience may be as follows. While shopping at a retail store, at checkout, the customer will i) purchase a product on a retail website e.g. Amazon, BestBuy, eBay, etc., ii) be offered an option on the user interface to have the purchased items delivered to his car using the Box2Go service application in the cloud-based package-to-and-from-a-vehicle-service, iii) selects the delivery method as "Box2Go Delivery," to have the package delivered to the vehicle, iv) optionally, selects the expected location of the vehicle to be either work or home, and v) checks-out and places the order with the retailer. The retailer will fulfill the order and prepare the package for delivery and delivers the package with a delivery service provider like FedEx.

The delivery service provider's Box2Go Delivery Process may include use cases with communications via WiFi hotspots, the telematics solution, and blue tooth exchanges between the internal intelligent software in the vehicle itself and the downloaded application resident in the client device. Thus, the GPS-based delivery application is downloadable or otherwise electronically distributed such as contained in flash drive type of computer readable medium to the client device from a database in the cloud based server.

For packages marked for "Box2Go Delivery", the delivery service provider initiates a query process for the delivery of the package with the package-to-and-from-a-vehicle-service in the cloud. The package-to-and-from-a-vehicle-service cloud verifies the customer information who requested the package delivery in its system and confirms that the customer has the Box2Go service application in the cloud-based package-to-and-from-a-vehicle-service available to allow for such a delivery. The package-to-and-from-a-vehicle-service cloud then sends verification back to the delivery service provider's site that the customer can accept a Box2Go delivery.

Shipping Experience—Delivery Planning

Prior to the delivery service provider's route planning, the cloud-based package-to-and-from-a-vehicle-service sends a push message (preferably early in the morning) to the customer's cell phone of the Customer requesting confirmation for the vehicle delivery for the package with the Order details. The Customer confirms the vehicle delivery option by sending a message back to the cloud-based package-to-and-from-a-vehicle-service. The customer may notice a push-message for Box2Go application. Once the cloud-based package-to-and-from-a-vehicle-service receives the customer's confirmation for the car delivery, the cloud-based package-to-and-from-a-vehicle-service will generate a virtual Car Key. The cloud-based package-to-and-from-a-vehicle-service sends a virtual Car Key to the delivery service provider server. The virtual Car Key is issued with a limited shelf life and will expire even if not used within a defined amount of time, such as 4 hours. Note, the dual key security protects against if either the virtual Car key or access token are compromised. The limited shelf life expiration protects against if BOTH the virtual Car Key and access token are compromised, they are only valid for a limited window of time established by the cloud-based package-to-and-from-a-vehicle-service. Thus, the security of the vehicle is protected in multiple ways. The delivery service provider system then links the virtual Car Key to the delivery order. The delivery service provider systems are then ready to execute the package delivery to the Customer's vehicle.

Pre-Delivery

The delivery service provider prepares the Box2Go package to be delivered to the customer's car. The delivery service provider plans the delivery route based on either the address selected for Box2Go delivery at the time of checkout or the current location of the vehicle. On delivery day, the delivery service provider's delivery vehicle looks up the virtual Car Key associated with the order in the Box2Go app. The delivery service provider contacts the cloud-based package-to-and-from-a-vehicle-service to get the location of the car. The cloud-based package-to-and-from-a-vehicle-service then receives the last known location of the car and sends it back to the delivery service provider's Box2Go app. If the current location of the vehicle is in his delivery zone, the delivery service provider's system moves ahead with the delivery. If the vehicle to deliver to is not in the delivery zone, then that delivery is skipped and marked for differed mail delivery.

Real-Time Tracking of the Delivery Service Provider's Vehicle

While tracking the delivery service provider's delivery vehicle driving toward the delivery location, an application in the delivery vehicle can notify the cloud-based package-to-and-from-a-vehicle-service of the delivery vehicle's location. The cloud-based package-to-and-from-a-vehicle-service anticipates the delivery of a package to the car and wakes up the vehicle's system by issuing a command. When the delivery service provider's vehicle approaches near the car (like 100 meters), the cloud-based package-to-and-from-a-vehicle-service automatically alerts the vehicle and the vehicle starts flashing lights and beeps a few times. This helps the delivery service provider's driver to locate the exact vehicle in a parking lot.

To unlock the car once delivery service provider's delivery reaches the car, the application used by the delivery person uses the Box2Go app to send an Unlock command. The cloud-based package-to-and-from-a-vehicle-service intercepts this command and issues an Unlock command to the telematics system site. The telematics system site triggers an unlock request in the car's telematics module by sending this Unlock command to electromechanically unlock a trunk or door of the vehicle.

The delivery person places the package inside the customer's car, closes the car door/trunk, and then uses the Box2Go app to send a lock command. Like above, the cloud-based package-to-and-from-a-vehicle-service intercepts this command and issues a Lock command to the telematics system site. The telematics system site triggers a lock request in the car's telematics module by sending the lock command.

A confirmation message is sent from the package-to-and-from-a-vehicle-service to the delivery service provider's server and to the customer on the Box2Go app on the customer's cell phone. The delivery process is completed when the package-to-and-from-a-vehicle-service destroys the virtual CarKey for the order.

Revenue

FIGS. 8A-8D illustrate block and flow diagrams 800, 825, 850, and 875 of embodiment of the value proposition of the alternative delivery system. As discussed above, the user/customer may pay an additional fee on a per delivery/per pick-up instance to use the package-to-and-from-a-vehicle-service. The user/customer may pay a monthly or yearly subscription fee for all deliveries and pick-ups of packages to use the package-to-and-from-a-vehicle-service. The user/customer may pay on another usage case model. A revenue sharing agreement may be in place between the retailer, the package-to-and-from-a-vehicle-service, the delivery service provider, and the OEM provider. The delivery service may subsidize the delivery of packages to increase volume, make package delivery more efficient, and eliminate re-delivering of packages. For example, in a survey of United Kingdom deliveries, 12% of deliveries failed first time. This costs the delivery industry $1.3 billion in re-deliveries per year. Advertisers may also subsidize the delivery of packages by placement of advertisements in the order placing and delivery process. Combinations of the above may be used in the revenue generating processes for using the package-to-and-from-a-vehicle-service. The backend servers of the delivery service, the package-to-and-from-a-vehicle-service, and retailer sites collect and distribute the compensation.

High Level Description of Each Transaction in Case of Dongle/eHorizon Solution

Figure 4:
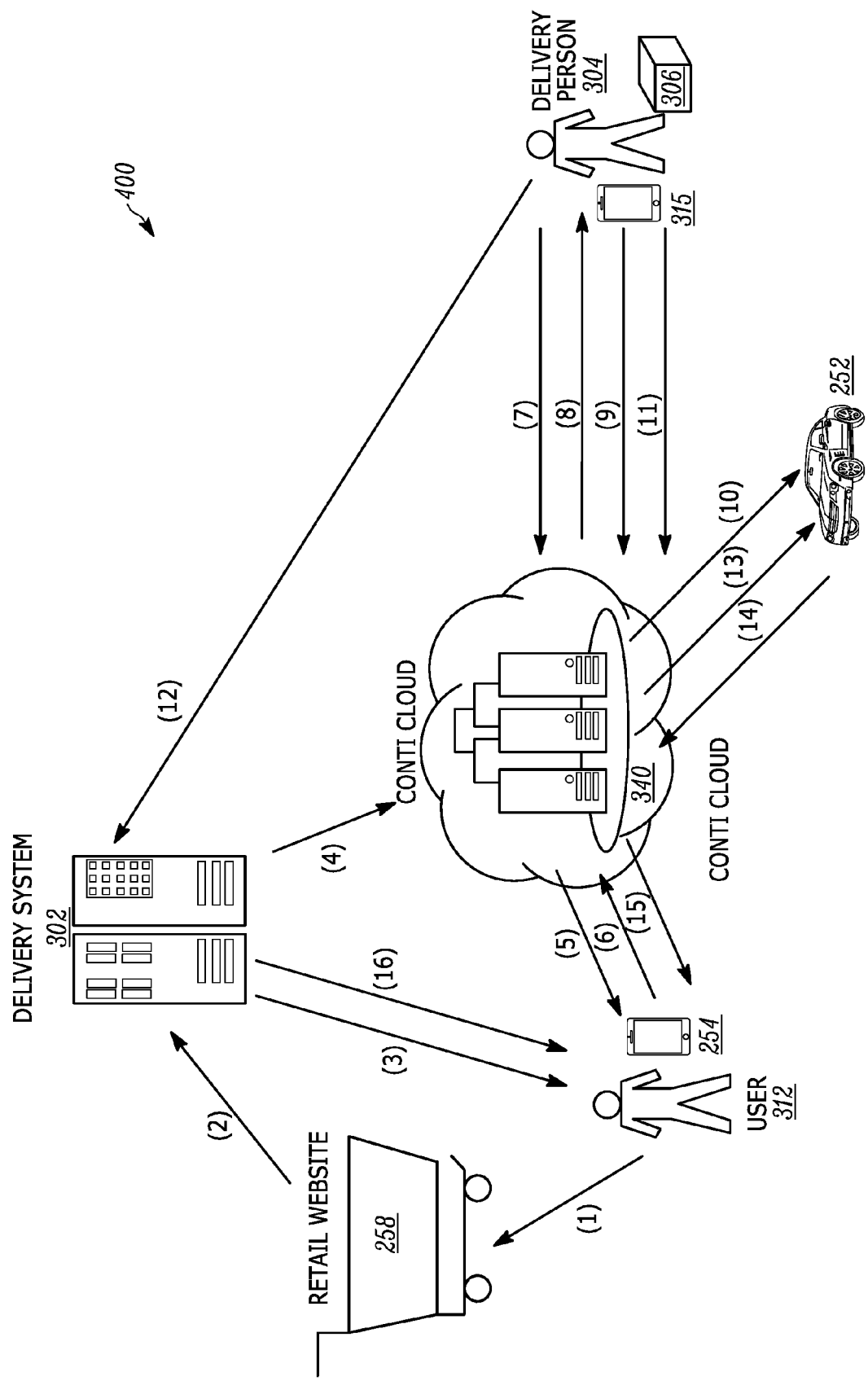
FIG. 4 illustrates a flow diagram of an embodiment of the alternative package pickup and delivery system using an example Dongle topology.

FIG. 4 illustrates a flow diagram 400 of an embodiment of the alternative package pickup and delivery system using an example Dongle/eHorizon topology.

In an embodiment, a software application, such as eHorizon, is configured to provide a new intelligence in a vehicle's navigation. eHorizon software leads the way to an intelligent and expanded use of navigation data to control other vehicle systems. Additional hardware may be installed in the target vehicle to assist in the package to and from the vehicle process. A dongle may be a small piece of hardware that attaches to the vehicle in order to enable additional functions.

(0) Steps 1-7 are the same as the previous solution.

(1) The User uses either a mobile application on their client device or accesses a retailer's website via a browser on their client device. The retailer's website collects order information including the products selected. The client device submits order and shipping information via the mobile application to the retailer's website, and in the case of delivering to a vehicle, the order includes the vehicle VIN.

(2) The retailer's website sends shipping information to the package delivery entity system.

(3) The package delivery entity system sends confirmation including a Tracking Number to User.

(4) The package delivery entity system sends notification to the package-to-and-from-the-vehicle-service cloud system, including the Tracking Number and VIN.

(5) The package-to-and-from-the-vehicle-service cloud system confirms with the User via Tracking Number and VIN.

(6) User sends Permission (User name and Password) for the telematics system to the package-to-and-from-the-vehicle-service cloud system.

(7) After the package arrives in the same city, the package delivery entity system's delivery person sends the Tracking Number to the package-to-and-from-the-vehicle-service cloud system for vehicle location information.

(8) After step (6), the package-to-and-from-the-vehicle-service cloud system has tracked the vehicle's location and sends it out upon a request from the package delivery person.

(9) After the package delivery entity system's delivery person approaches the vehicle, a request is sent to the package-to-and-from-the-vehicle-service cloud system to blink the hazard lights and open the trunk.

(10) The package-to-and-from-the-vehicle-service cloud system verifies the request and unlocks the trunk.

(11) After storing the package into the trunk and closing the trunk, the package delivery entity system's delivery person sends a confirmation to the package-to-and-from-the-vehicle-service cloud system.

(12) The package delivery entity system's delivery person sends confirmation to the package delivery entity system.

(13) After (11), the package-to-and-from-the-vehicle-service cloud system polls the trunk door status of the vehicle.

(14) Dongle/eHorizon responds with the trunk door status (open/closed).

(15) The package-to-and-from-the-vehicle-service cloud system sends a delivery confirmation notice to the User.

(16) The package delivery entity system sends delivery confirmation email to User.

The Dongle/eHorizon solution utilizes the OEM to access BCM. Most of the transactions are protected by HTTPS protocol (public-private key pairs and certificate). A security mechanism such as HTTPS protocol is supported by all popular web frameworks. The whole system has several cyber security mechanisms: i) the server in the package-to-and-from-the-vehicle-service cloud system needs to apply for a certificate from one of the trusted CAs, ii) the package delivery entity system's delivery person needs to register for verification, and iii) the User needs to register with the package-to-and-from-the-vehicle-service cloud system to use the service by both verifying the vehicle type is supported and identifying the verification with OEM backend.

The GPS-based proximity system of the geo-proximity VAAS 340 obtains at least two virtual verification keys, one from an OEM telematics provider 310 and another from a package delivery service provider 302 before sending a command to the target vehicle 252. The virtual verification keys are given a shelf life such that sending of the command to unlock the door including the trunk of the target vehicle the target vehicle stays within a predetermined time frame.

Computing System

FIG. 1 illustrates a block diagram 800 of an example computing system that may be used in an embodiment of one or more of the servers, in-vehicle electronic modules, and client devices discussed herein. The computing system environment 800 is only one example of a suitable computing environment, such as a client device, server, in-vehicle electronic module, etc, and is not intended to suggest any limitation as to the scope of use or functionality of the design of the computing system 810. Neither should the computing environment 800 be interpreted as having any dependency or requirement relating to any one or combination of components illustrated in the exemplary operating environment 800.

With reference to FIG. 1, components of the computing system 810 may include, but are not limited to, a processing unit 820 having one or more processing cores, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus.

Computing system 810 typically includes a variety of computing machine readable media. Computing machine readable media can be any available media that can be accessed by computing system 810 and includes both volatile and nonvolatile media, removable and non-removable media. By way of example, and not limitation, computing machine readable mediums uses include storage of information, such as computer readable instructions, data structures, program modules or other data. Computer storage mediums include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by computing device 800. However, carrier waves would not fall into a computer readable medium. Communication media typically embodies computer readable instructions, data structures, program modules, or other transport mechanism and includes any information delivery media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computing system 810, such as during start-up, is typically stored in ROM 831. RAM 832 typically contains data and/or program modules that are immediately accessible to and/or presently being operated on by processing unit 820. By way of example, and not limitation, FIG. 1 illustrates operating system 834, program modules 836, and program data 837.

The computing system 810 may also include other removable/non-removable volatile/nonvolatile computer storage media. By way of example only, FIG. 1 illustrates a hard disk drive 841 that reads from or writes to non-removable, nonvolatile magnetic media nonvolatile optical disk 856 such as a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 1, provide storage of computer readable instructions, data structures, program modules and other data for the computing system 810. In FIG. 1, for example, hard disk drive 841 is illustrated as storing operating system 844, program modules 846, and program data 847. Note that these components can either be the same as or different from operating system 834, program modules 836, and program data 837. Operating system 844, program modules 846, and program data 847 are given different numbers here to illustrate that, at a minimum, they are different copies.

A user may enter commands and information into the computing system 810 through input devices such as a keyboard 862, a microphone 863, a pointing device 861, such as a mouse, trackball or touch pad. The microphone 863 may cooperate with speech recognition software. These and other input devices are often connected to the processing unit 820 through a user input interface 860 that is coupled to the system bus, but may be connected by other interface and bus structures, such as a parallel port, game port or a universal serial bus (USB). A display monitor 891 or other type of display screen device is also connected to the system bus 821 via an interface, such as a video interface 890. In addition to the monitor, computing devices may also include other peripheral output devices such as speakers 897 and other output device 896, which may be connected through an output peripheral interface 890.

The computing system 810 may operate in a networked environment using logical connections to one or more remote computers/client devices, such as a remote computing device 880. The remote computing device 880 may be a personal computer, a hand-held device, a server, a router, a network PC, a peer device or other common network node, and typically includes many or all of the elements described above relative to the computing system 810. The logical connections depicted in FIG. 1 include a local area network (LAN) 871 and a wide area network (WAN) 873, but may also include other networks. Such networking environments are commonplace in offices, enterprise-wide computer networks, intranets and the Internet. A browser application may be resident in the computing device and stored in the memory.

When used in a LAN networking environment, the computing system 810 is connected to the LAN 871 through a network interface or adapter 870. When used in a WAN networking environment, the computing system 810 typically includes a modem 872 or other means for establishing communications over the WAN 873, such as the Internet. The modem 872, which may be internal or external, may be connected to the system bus 821 via the user-input interface 860, or other appropriate mechanism. In a networked environment, program modules depicted relative to the computing system 810, or portions thereof, may be stored in the remote memory storage device. By way of example, and not limitation, FIG. 1 illustrates remote application programs 885 as residing on remote computing device 880. It will be appreciated that the network connections shown are exemplary and other means of establishing a communications link between the computing devices may be used.

As discussed, the computing system may include a processor, a memory, a built in battery to power the computing device, an AC power input, potentially a built-in video camera, a display screen, a built-in Wi-Fi circuitry to wirelessly communicate with a remote computing device connected to network.

It should be noted that the present design can be carried out on a computing system such as that described with respect to FIG. 1. However, the present design can be carried out on a server, a computing device devoted to message handling, or on a distributed system in which different portions of the present design are carried out on different parts of the distributed computing system.

Another device that may be coupled to bus 811 is a power supply such as a battery and Alternating Current adapter circuit. As discussed above, the DC power supply may be a battery, a fuel cell, or similar DC power source that needs to be recharged on a periodic basis. The wireless communication module 872 may employ a Wireless Application Protocol to establish a wireless communication channel. The wireless communication module 872 may implement a wireless networking standard such as Institute of Electrical and Electronics Engineers (IEEE) 802.11 standard, IEEE std. 802.11-1999, published by IEEE in 1999.

Examples of mobile computing devices may be a laptop computer, a cell phone, a personal digital assistant, or other similar device with on board processing power and wireless communications ability that is powered by a Direct Current (DC) power source that supplies DC voltage to the mobile device and that is solely within the mobile computing device and needs to be recharged on a periodic basis, such as a fuel cell or a battery.

Vehicle's Intelligent Transport Systems to Integrate with a Connected Network Environment A vehicle has hardware and software that can take control of the vehicle for a short period including activating electromechanical mechanisms that are part of the vehicle. The vehicle has hardware and software for networking between the clouds as well as potentially between other vehicles to cause related automation within the vehicle based on communications between the vehicle and the cloud and/or other vehicles. The vehicle's Cellular Interface system is configured to allow cellular phones access the automobile computer systems, interpret the information and show the text on the cellular phones display while simultaneously transmitting the retrieved information, as well as characteristic and states of the cellular phone used to access the vehicle computer system, to a global network that would alert parties who could assist or benefit from the retrieved automobile information. A cellular phone with a software application can establish a connection with the vehicle's on-board diagnostic computer and/or other on-board intelligent control systems.

The system can interface with a client device, such as a mobile phone, with the on-board computing system in the vehicle. The on-board diagnostic computing device may monitor a set of operational characteristics of a vehicle and communicate that diagnostic to both the driver and with the cloud. The information derived from this system can also be conveyed and processed on a mobile client device coupled with additional information and displayed on the mobile client device's display screen, while simultaneously transmitting this information over the Internet to be stored in a database.

At the point of communication negotiation, an application on the client device extracts position location from the vehicle's navigation system and transmits the response from the vehicle's navigation system and the location to a server ready to receive this information. Alternatively, an application can extract similar position information from GPS module internal to the client device itself.

In an embodiment, the standard for the automotive industry for vehicles may use is the SAE J1850 communications protocol, which utilizes variable pulse width modulation and pulse width modulation. This means that the width of the pulse determines whether it is a 1 or a 0. Most phones form communication with serial connections (RS-232, Infrared . . . etc.) and wireless connection protocols (Bluetooth, Infrared . . . etc.). These two protocols must be converted or bridged by some sort of microprocessor so the two communication methodologies can communicate with each other. This can be accomplished by using an integrated circuit that can be used to convert the OBD-II signal (which includes different protocols such as, but not limited to: J1850 VPW, J1850 PWM, ISO 9141-2, ISO 14230, ISO 15765) to one of the aforementioned phone communication formats.

Network Environment

FIGS. 2A-2B illustrate block diagrams of embodiments of the package-to-and-from-a-vehicle-service hosted on a cloud-based provider site. The cloud-based package-to-and-from-a-vehicle-service is hosted on a cloud-based provider site that contains one or more servers and one or more databases. FIG. 2A illustrates diagram 200 of a network environment in which the techniques described may be applied. The network environment 200 has a communications network 220 that connects server computing systems 204A through 204E, and at least one or more client computing systems 202A, 202B. As shown, there may be many server computing systems 204A through 204E and many client computing systems 202A through 202B connected to each other via the network 220, which may be, for example, the Internet. Note, that alternatively the network 220 might be or include one or more of: an optical network, the Internet, a Local Area Network (LAN), Wide Area Network (WAN), satellite link, fiber network, cable network, or a combination of these and/or others. It is to be further appreciated that the use of the terms client computing system and server computing system is for clarity in specifying who generally initiates a communication (the client computing system) and who responds (the server computing system). No hierarchy is implied unless explicitly stated. Both functions may be in a single communicating device, in which case the client-server and server-client relationship may be viewed as peer-to-peer. Thus, if two systems such as the client computing system 202A and the server computing system 204A can both initiate and respond to communications, their communication may be viewed as peer-to-peer. Likewise, communications between the client computing systems 204A and 204-2, and the server computing systems 202A and 202B may be viewed as peer-to-peer if each such communicating device is capable of initiation and response to communication. Additionally, server computing systems 204A-204E also have circuitry and software to communicate with each other across the network 220. One or more of the server computing systems 204A to 204E may be associated with a database such as, for example, the databases 206A to 206E. Each server may have one or more instances of a virtual server running on that physical server and multiple virtual instances may be implemented by the design. A firewall may be established between a client computing system 200A and the network 220 to protect data integrity on the client computing system 200A. Each server computing system 204A-204E may have one or more firewalls.

FIG. 2B illustrate block diagram 250 of an embodiment of the package-to-and-from-a-vehicle-service hosted on a cloud-based provider site. The web server farm 270 may have examples of 4 servers coupled to databases 275 which may have examples of 2 database clusters. A user can download and use either i) a vehicle package delivery/ pickup mobile application 254 or ii) a vehicle package delivery/pickup desktop application 350 on their client device to register with the package-to-and-from-the-vehicle-service cloud system 340 (see, for example, FIG. 3B). The cloud-based package-to-and-from-a-vehicle-service hosted on a cloud-based provider site contains one or more servers and one or more databases. The one or more databases store at least i) User ID and Password for the package-to-and-from-a-vehicle-service, ii) User name, iii) email or contact phone number of the user, iv) Security questions, v) Vehicle VIN, vi) Vehicle make, model, color, year, and vii) any combination of at least three of these. In one embodiment, the cloud based network 260 is configured to communication with 1) a user's mobile application 254, 2) a retailer website 258, 3) a telematics module of vehicle 252, via a secure connection 256 from a telematics provider to vehicle 252, and 4) a package delivery vehicle 262. The cloud based network 260 includes/is coupled to servers 270 which are protected by an external firewall 264 from the users and providers. The cloud based network 260 also includes/is coupled to databases 275 which are protected by an internal firewall 266 from the servers 270.

Thus, the GPS-based proximity system is hosted on a cloud-based provider site that contains one or more servers 270 and one or more databases 275. The GPS-based proximity system presents one or more application programming interfaces to provide a single common end-to-end solution between servers of one or more package delivery services and servers of one or more OEM telematics providers 310 without additional hardware required to be installed in the target vehicle. The first threshold distance may be calculated by the one or more processors based on factors including current traffic data as well as actual distance between the client device and the target vehicle.

A cloud provider service can install and operate application software in the cloud and users can access the software service from the client devices. Cloud users who have a site in the cloud may not solely manage the cloud infrastructure and platform where the application runs. Thus, the servers and databases may be shared hardware where the user is given a certain amount of dedicate use of these resources. The user's is given a virtual amount of dedicated space and bandwidth in the cloud. Cloud applications can be different from other applications in their scalability—which can be achieved by cloning tasks onto multiple virtual machines at run-time to meet changing work demand. Load balancers distribute the work over the set of virtual machines. This process is transparent to the cloud user, who sees only a single access point.

The cloud-based package-to-and-from-a-vehicle-service is coded to utilize a protocol, such as Hypertext Transfer Protocol (HTTP), to engage in a request and response cycle with both a mobile device application resident in a client device as well as a web-browser application resident in the client device. The cloud-based package-to-and-from-a-vehicle-service has one or more routines to automate a package delivery to and pick up from the vehicle process. The cloud-based package-to-and-from-a-vehicle-service can be accessed by a mobile device, a desktop, a tablet device, and other similar devices, anytime, anywhere. Thus, the cloud-based package-to-and-from-a-vehicle-service hosted on a cloud-based provider site is coded to engage in 1) the request and response cycle from all web browser based applications, 2) SMS/twitter based request and response message exchanges, 3) the request and response cycle from a dedicated on-line server, 4) the request and response cycle directly between a native mobile application resident in a client device and the cloud-based package-to-and-from-a-vehicle-service, and 5) combinations of these.

The cloud-based package-to-and-from-a-vehicle-service has one or more application programming interfaces (APIs) with two or more of the package delivery entity sites, such as FedEx, UPS, etc., as well as application programming interfaces with two or more of the OEM 'remote access/connectivity' systems, such as telematics system sites, such as OnStar, Lexus Linksys, Ford Sync, Uconnect, MBConnect, BMWConnect, etc. The APIs may be a published standard for the connection to each OEM 'remote access/connectivity' system. The APIs may also be an open source API. One or more of the API's may be customized to closed/non-published APIs of a remote access/connectivity' site and/or package delivery entity site. The cloud-based package-to-and-from-a-vehicle-service is coded to establish a secure communication link between each package delivery entity site and the cloud provider site. The cloud-based package-to-and-from-a-vehicle-service is coded to establish a secure communication link between each telematics system site and the cloud provider site. The software service is coded to establish the secure communication link by creating a tunnel at the socket layer and encrypting any data while in transit between each package delivery entity sites and the provider site as well as to satisfy any additional authentication mechanisms required by the direct lending institution, including but not limited to IP address white listing and token based authentication.

In an embodiment, the server computing system 204 may include a server engine, a web page management component, a content management component and a database management component. The server engine performs basic processing and operating system level tasks. The web page management component handles creation and display or routing of web pages or screens associated with receiving and providing digital content and digital advertisements. Users may access the server-computing device by means of a URL associated therewith. The content management component handles most of the functions in the embodiments described herein. The database management component includes storage and retrieval tasks with respect to the database, queries to the database, and storage of data.

An embodiment of a server computing system to display information, such as a web page, etc. An application including any program modules, when executed on the server computing system 204A, causes the server computing system 204A to display windows and user interface screens on a portion of a media space, such as a web page. A user via a browser from the client computing system 200A may interact with the web page, and then supply input to the query/fields and/or service presented by a user interface of the application. The web page may be served by a web server computing system 204A on any Hypertext Markup Language (HTML) or Wireless Access Protocol (WAP) enabled client computing system 202A or any equivalent thereof. For example, the client mobile computing system 202A may be a smart phone, a touch pad, a laptop, a netbook, etc. The client computing system 202A may host a browser to interact with the server computing system 204A. Each application has a code scripted to perform the functions that the software component is coded to carry out such as presenting fields and icons to take details of desired information. Algorithms, routines, and engines within the server computing system 204A take the information from the presenting fields and icons and put that information into an appropriate storage medium such as a database. A comparison wizard is scripted to refer to a database and make use of such data. The applications may be hosted on the server computing system 204A and served to the browser of the client computing system 202A. The applications then serve pages that allow entry of details and further pages that allow entry of more details.

Telematics System

The telematics system uses telecommunications, vehicular technologies, electrical sensors, instrumentation, and wireless communications modules to allow communication with between the cloud and a vehicle. The telematics system site sends, receives and stores information via a telematics module to affect control on objects in the vehicle. Telematics includes but is not limited to Global Positioning System technology integrated with computers and mobile communications technology in automotive navigation systems. Telematics also includes cloud-based interaction with an integrated hands-free cell phone system in the vehicle, wireless safety communication system in the vehicle, and automatic driving assistance systems.

A wireless communication circuit exchanges communication between the mobile client device and the vehicle. The wireless communication circuit executes instructions with the processor via a bus system. The wireless communication circuit can be configured to communicate to RF (radio frequency), satellites, cellular phones (analog or digital), Bluetooth®V, Wi-Fi, Infrared, Zigby, Local Area Networks (LAN), WLAN (Wireless Local Area Network), or other wireless communication configurations and standards. The wireless communication circuit allows the vehicle's intelligence systems such as the telematics module and other diagnostic tools to communicate with other devices wirelessly. The wireless communication circuit includes an antenna built therein and being housed within the housing or can be externally located on the housing.

The Telecommunications and Informatics applied in wireless technologies and computational systems. 802.11p, the IEEE standard in the 802.11 family and also referred to as Wireless Access for the Vehicular Environment (WAVE), is the primary standard that addresses and enhances Intelligent Transportation System.

An example telematics module sends commands and exchanges information other electronic circuits, electromechanical devices, and electromagnetic devices in the vehicle. The telematics module may operate in conjunction with computer-controlled devices and radio transceivers to provide precision repeatability functions (such as in robotics artificial intelligence systems) and emergency warning performance systems located in and exchanged between vehicles.

Additional intelligent vehicle technologies are car safety systems and self-contained autonomous electromechanical sensors to generate warnings that can be transmitted within a specified targeted area of interest, say within 100 meters of the emergency warning system for vehicles transceiver. In ground applications, intelligent vehicle technologies are utilized for safety and commercial communications between vehicles or between a vehicle and a sensor along the road.

The wireless communication circuits in the vehicle or in a client device are configured to give access to the mobile Internet via a cellular telephone service provider. The mobile Internet is wireless access that handoffs the mobile client device or vehicle from one radio tower to another radio tower while the vehicle or device is moving across the service area. Also, in some instances Wi-Fi may be available for users on the move so that a wireless base station connects directly to an Internet service provider, rather than through the telephone system.

Scripted Code

In regards of viewing ability of an on-line site: the scripted code for the on-line site, such as a website, social media site, etc., is configured to adapted to be i) viewed on tablets and mobile phones, such as individual downloadable applications in data stores that are designed to interface with the on-line site, ii) viewable on a screen in the vehicle, as well as iii) viewable on a screen of a desktop computer via a browser. Those skilled in the relevant art will appreciate that the invention can be practiced with other computer system configurations, including Internet appliances, handheld devices, wearable computers, cellular or mobile phones, multi-processor systems, microprocessor-based or programmable consumer electronics, set-top boxes, network PCs, mini-computers, mainframe computers and the like.

Mobile web applications and native applications can be downloaded from a cloud-based site. The mobile web applications and native applications have direct access to the hardware of mobile devices (including accelerometers and GPS chips), and the speed and abilities of browser-based applications. Information about the mobile phone and the vehicle's location is gathered by software housed on the phone.

One or more scripted routines for the cloud-based package-to-and-from-a-vehicle-service are configured to collect and provide features such as those described herein.

Any application and other scripted code components may be stored on a non-transitory computing machine readable medium which, when executed on the server causes the server to perform those functions. The applications including program modules may be implemented as logical sequences of software code, hardware logic circuits, and any combination of the two, and portions of the application scripted in software code are stored in a non-transitory computing device readable medium in an executable format. In an embodiment, the hardware logic consists of electronic circuits that follow the rules of Boolean Logic, software that contain patterns of instructions, or any combination of both.

The design is also described in the general context of computing device executable instructions, such as program modules etc. being executed by a computing device. Generally, program modules include routines, programs, objects, applications, widget, plug-ins, and other similar structures that perform particular tasks or implement particular abstract data types. Those skilled in the art can implement the description and/or figures herein as computer-executable instructions, which can be embodied on any form of computing machine readable media discussed herein.

Some portions of the detailed descriptions herein are presented in terms of algorithms/routines and symbolic representations of operations on data bits within a computer memory. These algorithmic descriptions and representations are the means used by those skilled in the data processing arts to most effectively convey the substance of their work to others skilled in the art. An algorithm/routine is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms/routine of the application including the program modules may be written in a number of different software programming languages such as C, C++, Java, HTML, or other similar languages.

Many online pages on a server, such as web pages, are written using the same language, Hypertext Markup Language (HTML), which is passed around using a common protocol—HTTP. HTTP is the common Internet language (dialect, or specification). Through the use of a web browser, a special piece of software that interprets HTTP and renders HTML into a human-readable form, web pages authored in HTML on any type of computer can be read anywhere, including telephones, PDAs and even popular games consoles. Because of HTTP, a client machine (like your computer) knows that it has to be the one to initiate a request for a web page; it sends this request to a server. A server may be a computing device where web sites reside—when you type a web address into your browser, a server receives your request, finds the web page you want, and sends it back to your desktop or mobile computing device to be displayed in your web browser. The client device and server may bilaterally communicate via a HTTP request & response cycle between the two.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computing system, or similar electronic computing device, that manipulates and transforms data represented as physical (electronic) quantities within the computing system's registers and memories into other data similarly represented as physical quantities within the computing system memories or registers, or other such information storage, transmission or display devices.

Although embodiments of this design have been fully described with reference to the accompanying drawings, it is to be noted that various changes and modifications will become apparent to those skilled in the art. Such changes and modifications are to be understood as being included within the scope of embodiments of this design as defined by the appended claims. The invention is to be understood as not limited by the specific embodiments described herein, but only by scope of the appended claims.

What is claimed is:

1. A geo-proximity Vehicle Alert and Access System (VAAS), comprising:
  a cloud based server having a Global Positioning System (GPS) based proximity system having one or more processors configured to execute instructions to control and track a package exchange process, to speed up a package delivery and pick-up process, and to ensure security for the package exchange process;
  where the GPS-based proximity system is configured to receive both current GPS coordinates of a client device associated with a package carrier's vehicle from the client device and current GPS coordinates of a target vehicle for at least one of i) package delivery to the target vehicle and ii) package pick up from the target vehicle, where the GPS-based proximity system is further configured to send to the target vehicle one or more commands 1) to wake-up an on-board actuation module in the target vehicle while in a close proximity established by a first threshold distance between the package carrier's vehicle and the target vehicle, 2) to give an alert from the target vehicle while in a close proximity established by a second threshold distance between the package carrier's vehicle and the target vehicle, 3) to unlock a door including a trunk of the target vehicle, and 4) to lock the doors of the target vehicle after the package exchange has occurred when the target vehicle and the client device are at a third threshold separation distance;
  wherein the GPS-based proximity system is configured to obtain at least two virtual verification keys, one from an OEM telematics provider and another from a package delivery service provider before sending a command to the target vehicle, where the virtual verification keys are given a shelf life such that sending of the command to unlock the door including the trunk of the target vehicle the target vehicle stays within a predetermined time frame; and
  wherein the First threshold distance is calculated by the one or more processors in cooperation with a GPS based proximity control routine in the GPS proximity based system and the calculation is based on factors including current traffic data as well as actual distance between the client device and the target vehicle.

2. The geo-proximity VAAS of claim 1, wherein the GPS-based proximity system is hosted on a cloud-based provider site that contains one or more servers, including the cloud-based server, that cooperate with one or more databases to store the data and reference information needed to control and track the package exchange process, to speed up the package delivery and pick-up process, and to ensure security for the package exchange process, where the GPS-based proximity system is configured to present one or more application programming interfaces to provide a single common end-to-end solution between servers of one or more package delivery services and servers of one or more OEM telematics providers without additional hardware required to be installed in the target vehicle, and wherein the onboard actuation module is one of i) a telematics module installed in the target vehicle or ii) a dangle module having a WiFi or cellular communication circuit configured to establish a secure communication with the cloud based server and an electro-mechanical activation circuit configured to cooperate with a fault and diagnostic module installed in the target vehicle.

3. The geo-proximity VAAS of claim 2, wherein the GPS-based proximity system is configured to receive the current GPS coordinates of a package carriers vehicle from a GPS-based delivery application resident in 1) a first client device installed in the package carrier's vehicle, or 2) a second handheld client device that travels with a driver of a package carrier's vehicle, where the GPS-based delivery application is downloadable or otherwise electronically distributed to the client device from a database in the cloud based server; and
  wherein the GPS-based proximity system is configured to receive the GPS coordinates of the target vehicle from the telematics module of the target vehicle.

4. A geo-proximity Vehicle Alert and Access System (VAAS), comprising:
  a cloud based server having a Global Positioning System (GPS) based proximity system having one or more processors configured to execute instructions to control and track a package exchange process, to speed up a package delivery and pick-up process, and to ensure security for the package exchange process;
  where the GPS-based proximity system is configured to receive both current GPS coordinates of a client device associated with a package carrier's vehicle from the client device and current GPS coordinates of a target vehicle for at least one of i) package delivery to the target vehicle and ii) package pick up from the target vehicle, where the GPS-based proximity system is further configured to send to the target vehicle one or more commands 1) to wake-up an on-board actuation module in the target vehicle while in a close proximity established by a first threshold distance between the package carrier's vehicle and the target vehicle, 2) to give an alert from the target vehicle while in a dose proximity established by a second threshold distance between the package carrier's vehicle and the target vehicle, 3) to unlock a door including a trunk of the target vehicle, and 4) to lock the doors of the target vehicle after the package exchange has occurred when the target vehicle and the client device are at a third threshold distance; and wherein sending the command to unlock the target vehicle while in a close proximity established by a fourth threshold distance, which is smaller in preset distance than the second threshold distance, between the package carrier's vehicle and the target vehicle, wherein the one or more processors are configured to calculate the fourth threshold distance and the second threshold distance, and wherein unlocking includes acquiring an unlocking permission by the GPS-based proximity system by satisfying the fourth threshold distance as well as satisfying a security measure that the issuing of an unlocking command is occurring only within a preset time window, and then the GPS-based proximity system is configured to transmit the command to unlock to the onboard actuation module in the target vehicle, which then is coded to unlock one or more of the doors including unlocking the trunk of the target vehicle.

5. The geo-proximity VAAS of claim 4, wherein the GPS-based proximity system is further configured to calculate the third distance threshold with the one or more processors and then send a command to lock the target vehicle when the third distance threshold between the client device associated with the package carrier's vehicle and the target vehicle is satisfied, and wherein locking includes performing a lock verification to check to see if the doors of the target vehicle are indeed locked by the time the third distance threshold is satisfied, and then, if not locked, then send a command to the onboard actuation module to lock the target vehicle by locking one or more doors of the target vehicle, and, where the locking the doors includes ensuring the trunk and a sunroof are closed.

6. A geo-proximity Vehicle Alert and Access System (VAAS), comprising:
a cloud based server having a Global Positioning System (GPS) based proximity system having one or more processors configured to execute instructions to control and track a package exchange process, to speed up a package delivery and pick-up process, and to ensure security for the package exchange process;
where the GPS-based proximity system is configured to receive both current GPS coordinates of a client device associated with a package carrier's vehicle from the client device and current GPS coordinates of a target vehicle for at least one of i) package delivery to the target vehicle and ii) package pick up from the target vehicle, where the GPS-based proximity system is further configured to send to the target vehicle one or more commands 1) to wake-up an on-board actuation module in the target vehicle while in a close proximity established by a first threshold distance between the package carrier's vehicle and the target vehicle, 2) to give an alert from the target vehicle while in a close proximity established by a second threshold distance between the package carriers vehicle and the target vehicle, 3) to unlock a door including a trunk or the target vehicle, and 4) to lock the doors of the target vehicle after the package exchange has occurred when the target vehicle and the client device are at a third threshold separation distance;

wherein the onboard actuation module is the telematics module installed in the target vehicle, wherein the target vehicle's on-board telematics module is configured to 1) send data including GPS coordinates of the target vehicle to a server of an OEM telematics provider, and 2) receive one or more commands from the server of the OEM telematics provider, where the server of the OEM telematics provider is configured to send the GPS coordinates of the target vehicle to the cloud based server with the GPS based proximity system; and wherein the one or more processors are configured to calculate the first threshold distance, and then issue a request to a server of the OEM telematics provider to issue the command to wake up the telematics module by pinging the telematics module with intervals shorter than a predefined idle time before the telematics module goes to sleep.

7. The geo-proximity VAAS of claim 6, wherein the on-board telematics module of the target vehicle is coupled to an intelligent control system in the target vehicle, where the cloud based server is configured to send commands to the on-board telematics module and to the intelligent control system of the target vehicle via communication with the telematics module in the target vehicle through one or more servers of an OEM telematics provider, and wherein the commands include waking up the telematics module and performing mechanical actions of locking and unlocking the target vehicle, opening and closing doors, and giving the alert, wherein giving the alert includes one or a combination of 1) activating one or more lights of the target vehicle, 2) activating an alarm system of the target vehicle, and 3) honking a horn of the target vehicle.

8. A geo-proximity Vehicle Alert and Access System (VAAS), comprising:
a cloud based server having a Global Positioning System (GPS) based proximity system having one or more processors configured to execute instructions to control and track a package exchange process, to speed up a package delivery and pick-up process, and to ensure security for the package exchange process;
where the GPS-based proximity system is configured to receive both current GPS coordinates of a client device associated with a package carrier's vehicle from the client device and current GPS coordinates of a target vehicle for at least one of i) package delivery to the target vehicle and ii) package pick up from the target vehicle, where the GPS-based proximity system is further configured to send to the target vehicle one or more commands 1) to wake-up an on-board actuation module in the target vehicle while in a close proximity established by a first threshold distance between the package carrier's vehicle and the target vehicle, 2) to give an alert from the target vehicle while in a close proximity established by a second threshold distance between the package carriers vehicle and the target vehicle, 3) to unlock a door including a trunk of the target vehicle, and 4) to lock the doors of the target vehicle after the package exchange has occurred when the target vehicle and the client device are at a third threshold separation distance;

wherein the GPS-based proximity system is hosted on a cloud-based provider site that contains one or more servers, including the cloud-based server, that cooperate with one or more databases to store the data and reference information needed to control and track the package exchange process, to speed up the package delivery and pick-up process, and to ensure security for the package exchange process, where the GPS-based proximity system is configured to present one or more application programming interfaces to provide a single common end-to-end solution between servers of one or more package delivery services and servers of one or more OEM telematics providers without additional hardware required to be installed in the target vehicle, and wherein the onboard actuation module is one of i) a telematics module installed in the target vehicle or ii) a dongle module having a WiFi or cellular communication circuit configured to establish a secure communication with the cloud based server and an electromechanical activation circuit configured to cooperate with a fault and diagnostic module installed in the target vehicle;

wherein the cloud based server further includes:

a first module configured to provide one or more application programming interfaces between servers of two or more package delivery services and servers of two or more OEM telematics providers;

a first input socket configured to receive a first notification about a request for a package delivery to or pick-up from the target vehicle of a user via the one or more application programming interfaces from a first package delivery service;

a second module configured to communicate with a database of the cloud based server to store the first notification including a shipping Tracking Number (TN) and a Vehicle Identification Number (VIN) associated with the request=and to register the request for the package delivery to or pick-up from the target vehicle;

a third module configured to, upon registering the package delivery to or pick-up from request, send a second notification to the user via either a mobile application or a desktop application on a client device of the user to confirm with the user a desire to have a package with the shipping TN shipped to or picked-up from the target vehicle with the VIN;

a fourth module configured to use the one or more application programming interfaces with the two or more OEM telematics providers to establish wireless communications with an onboard telematics module in the target vehicle, where the fourth module is configured to send a request to a first OEM telematics provider via the one or more application programming interfaces to wake the target vehicle's onboard telematics module when the package carrier's vehicle is in close proximity established by the first threshold distance to a target vehicle matching the VIN; and where the fourth module is also configured to send a request to the first OEM telematics provider via the one or more application programming interfaces to unlock at least one of the trunk and the doors of the target vehicle via the target vehicle's onboard telematics module when an indication is received that a delivery person is ready to deliver or pick-up the package, and where the fourth module is configured to send a request to the first OEM telematics provider via the one or more application programming interfaces to lock at least one of the trunk and the doors of the target vehicle via the target vehicle's onboard telematics module when a confirmation is received that the delivery person has delivered or picked-up the package.

9. A speedy delivery and pick-up and secure package exchange method between a package carrier's vehicle and a target vehicle, comprising:

controlling and tracking a package transfer by a cloud based system;

monitoring a distance between the package carrier's vehicle and the target vehicle by receiving current GPS coordinates of the package carrier's vehicle and GPS coordinates of the target vehicle;

waking-up an on-board telematics module of the target vehicle while establishing a close proximity by a first threshold distance between the package carrier's vehicle and the target vehicle;

giving an alert by the target vehicle while establishing a close proximity by a second threshold distance between the package delivery vehicle and the target vehicle;

unlocking the target vehicle;

exchanging at least one package between the package carrier's vehicle and the target vehicle;

receiving a confirmation of the package transfer; and locking the target vehicle after receiving the confirmation.

10. The package exchange method of claim 9, further comprising:

unlocking the target vehicle while establishing a close proximity by a third threshold distance smaller than the second threshold distance between the package carrier's vehicle and the target vehicle, where unlocking includes acquiring a prior unlocking permission by the cloud based system, and where unlocking includes opening one or more doors of the target vehicle, the doors include a trunk and a sunroof; and locking the target vehicle when establishing a fourth distance separation threshold between the package carrier's vehicle and the target vehicle, where locking includes closing the doors of the target vehicle and performing a lock verification.

11. The package exchange method of claim 9, further including sending commands to the target vehicle via communication with the telematics module through an OEM telematics provider;

executing the commands by an intelligent controller in the target vehicle coupled the telematics module; and obtaining, by the cloud based system, at least two virtual verification keys from the OEM telematics provider and a package delivery service provider before sending a command to the target vehicle.

12. The package exchange method of claim 9, further comprising:

transmitting to a Global Positioning System (GPS) based proximity system the current GPS coordinates of the package carrier's vehicle from a resident application in 1) the package carrier's vehicle, or 2) a mobile device of the package carrier; and transmitting to the GPS-based proximity system the GPS coordinates of the target vehicle from the on-board telematics module of the target vehicle.

13. The package exchange method of claim 9, wherein the target vehicle's on-board telematics module further performing:

sending data including GPS coordinates to an OEM telematics provider;

receiving one or more commands from the OEM telematics provider, the commands including waking up the telematics module and performing mechanical actions of locking and unlocking the target vehicle, opening and closing doors, and giving the alert, where giving the alert includes 1) activating one or more lights of the target vehicle, 2) activating an alarm system of the target vehicle, and 3) honking a horn of the target vehicle.

14. The package exchange method of claim 9, wherein the first threshold distance is calculated based on current traffic data.

15. The package exchange method of claim 9, wherein prior to exchanging the at least one package performing:

offering to a customer on a user interface at a checkout of a retail website an alternative package delivery option of delivering to a vehicle of the customer;

selecting the alternative package delivery option by the customer;

uploading package transfer data to the cloud based system that implements package transfer;

tentatively proposing a date and time frame for the alternative package delivery to the customer.

16. The package exchange method of claim 9, further including:

receiving, by the cloud based system, a first notification about a request for a package delivery to or a package pickup from the target vehicle of a user;

storing a shipping tracking number and a Vehicle Identification Number of the target vehicle in a database of the cloud based system and registering the package delivery to or the package pickup from the target vehicle; and sending, by the cloud based system, a second notification to the user about an expected date and time frame of the package transfer and receiving a confirmation of the package delivery to or the package pickup from the target vehicle of the user.

17. The package exchange method of claim 9, further including:

acquiring a permission for unlocking the target vehicle from a user of the package transfer; and sending a package transfer confirmation and a target vehicle lock confirmation to the user of the package transfer, after exchanging the at least one package between the package carrier's vehicle and the target vehicle and locking the target vehicle.

\* \* \* \* \*